US012687679B2

(12) United States Patent
Butler et al.

(10) Patent No.: US 12,687,679 B2
(45) Date of Patent: Jul. 21, 2026

(54) FIBER HOLDERS AND ASSOCIATED METHODS FOR MAINTAINING RELATIVE ORIENTIATION OF FIBERS THEREIN

(71) Applicant: CORNING RESEARCH & DEVELOPMENT CORPORATION, Corning, NY (US)

(72) Inventors: Douglas Llewellyn Butler, Painted Post, NY (US); Jeffrey Scott Clark, Lindley, NY (US); David Evan Robinson, Corning, NY (US); James Scott Sutherland, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 708 days.

(21) Appl. No.: 18/100,611

(22) Filed: Jan. 24, 2023

(65) Prior Publication Data

US 2023/0236364 A1    Jul. 27, 2023

Related U.S. Application Data

(60) Provisional application No. 63/302,770, filed on Jan. 25, 2022.

(51) Int. Cl.
*G02B 6/36* (2006.01)
*F16L 3/12* (2006.01)
*F16L 3/223* (2006.01)

(52) U.S. Cl.
CPC ......... *G02B 6/3672* (2013.01); *G02B 6/3644* (2013.01); *G02B 6/3688* (2013.01); *F16L 3/1218* (2013.01); *F16L 3/223* (2013.01)

(58) Field of Classification Search
None
See application file for complete search history.

(56) References Cited

U.S. PATENT DOCUMENTS 6,328,481 B1    12/2001  Nakaya
6,621,976 B2 *  9/2003   Han ..................... G02B 6/3636
                                                         385/137

(Continued)

FOREIGN PATENT DOCUMENTS

AU      2001297945 A1    1/2003
CN      100590469 C      2/2010

(Continued)

OTHER PUBLICATIONS

Doany et al., "Multicore Fiber 4 TX + 4 RX Optical Transceiver Based on Holey SiGe IC"; IEEE; 2014 Electronic Components & Technology Conference, pp. 1016-1020.

(Continued)

*Primary Examiner* — Jerry Rahll
(74) *Attorney, Agent, or Firm* — Tamika A. Crawl-Bey

(57) ABSTRACT

A system for maintaining relative orientation of optical fibers in an array is provided. Fibers extend parallel and include a first fiber and an adjacent fiber. The system includes a fiber holder with alignment holes configured to receive stripped fiber sections. The alignment holes extend from the first surface to the second surface, and the alignment holes include a first alignment hole configured to receive a stripped fiber section of the first fiber and an adjacent alignment hole configured to receive a stripped fiber section of the adjacent fiber. The fiber holder has a wall separating the first alignment hole and the adjacent alignment hole that permits rotation of the stripped fiber section (Continued)

of the adjacent fiber in the adjacent alignment hole without causing rotation of the stripped fiber section of the first fiber in the first alignment hole.

13 Claims, 29 Drawing Sheets

(56)                    References Cited

U.S. PATENT DOCUMENTS

| | | | |
|---|---|---|---|
| 6,627,008 | B1 | 9/2003 | Taniguchi et al. |
| 6,931,177 | B2 * | 8/2005 | Suzuki ..................... G02B 6/32 |
| | | | 385/33 |
| 7,103,256 | B2 | 9/2006 | Song et al. |
| 9,568,684 | B2 | 2/2017 | Bradley et al. |
| 9,690,053 | B2 * | 6/2017 | Bradley ................. G02B 6/245 |
| 9,726,824 | B1 | 8/2017 | Berger et al. |
| 9,995,884 | B2 | 6/2018 | Bradley |
| 11,247,932 | B2 | 2/2022 | Demeritt et al. |
| 2003/0068153 | A1 * | 4/2003 | Suzuki ................ G02B 6/3839 |
| | | | 385/77 |
| 2004/0141707 | A1 | 7/2004 | Mozolowski |
| 2006/0115217 | A1 * | 6/2006 | Childers .............. G02B 6/3885 |
| | | | 385/53 |
| 2006/0245694 | A1 | 11/2006 | Chen et al. |
| 2013/0142487 | A1 | 6/2013 | Sasaoka |
| 2018/0156990 | A1 * | 6/2018 | Chou ................... G02B 6/4292 |
| 2019/0391341 | A1 | 12/2019 | Froggatt et al. |
| 2021/0141164 | A1 * | 5/2021 | Nakanishi ............ G02B 6/3636 |
| 2021/0239912 | A1 | 8/2021 | Demeritt et al. |

FOREIGN PATENT DOCUMENTS

| | | |
|---|---|---|
| CN | 102062897 A | 5/2011 |
| CN | 103988105 B | 10/2017 |
| CN | 208636211 U | 3/2019 |
| CN | 111239912 A | 6/2020 |
| CN | 111273405 A | 6/2020 |
| CN | 111473873 A | 7/2020 |
| CN | 108132503 B | 8/2020 |
| EP | 1407305 A1 | 4/2004 |
| EP | 2548061 A4 | 12/2017 |
| EP | 3274750 B1 | 5/2021 |
| EP | 3859416 A1 | 8/2021 |
| JP | 09-203822 A | 8/1997 |
| JP | 2004-233404 A | 8/2004 |
| JP | 2005-070692 A | 3/2005 |
| JP | 6338756 B2 | 6/2018 |
| JP | 6612336 B2 | 11/2019 |
| KR | 10-1458151 B1 | 11/2014 |
| WO | 2002/103403 A2 | 12/2002 |
| WO | 2011/116133 A1 | 9/2011 |
| WO | 2021/055484 A1 | 3/2021 |

OTHER PUBLICATIONS

K. Watanabe, et al., "Development of MPO type 8-multicore fiber connector," in Optical Fiber Communication Conference, OSA Technical Digest, 2015, paper W4B.3.

T. Morishima et al., "MCF-enabled ultra-high-density 256-core MT connector and 96-core physical-contact MPO connector," 2017 Optical Fiber Communications Conference and Exhibition (OFC), Los Angeles, CA, USA, 2017, pp. 1-3.

T. Morishima, et al., "Simple-Structure LC-Type Multi-Core Fiber Connector with Low Insertion Loss," in Optical Fiber Communication Conference (OFC) 2020, OSA Technical Digest, 2020, paper Th3I.2.

* cited by examiner

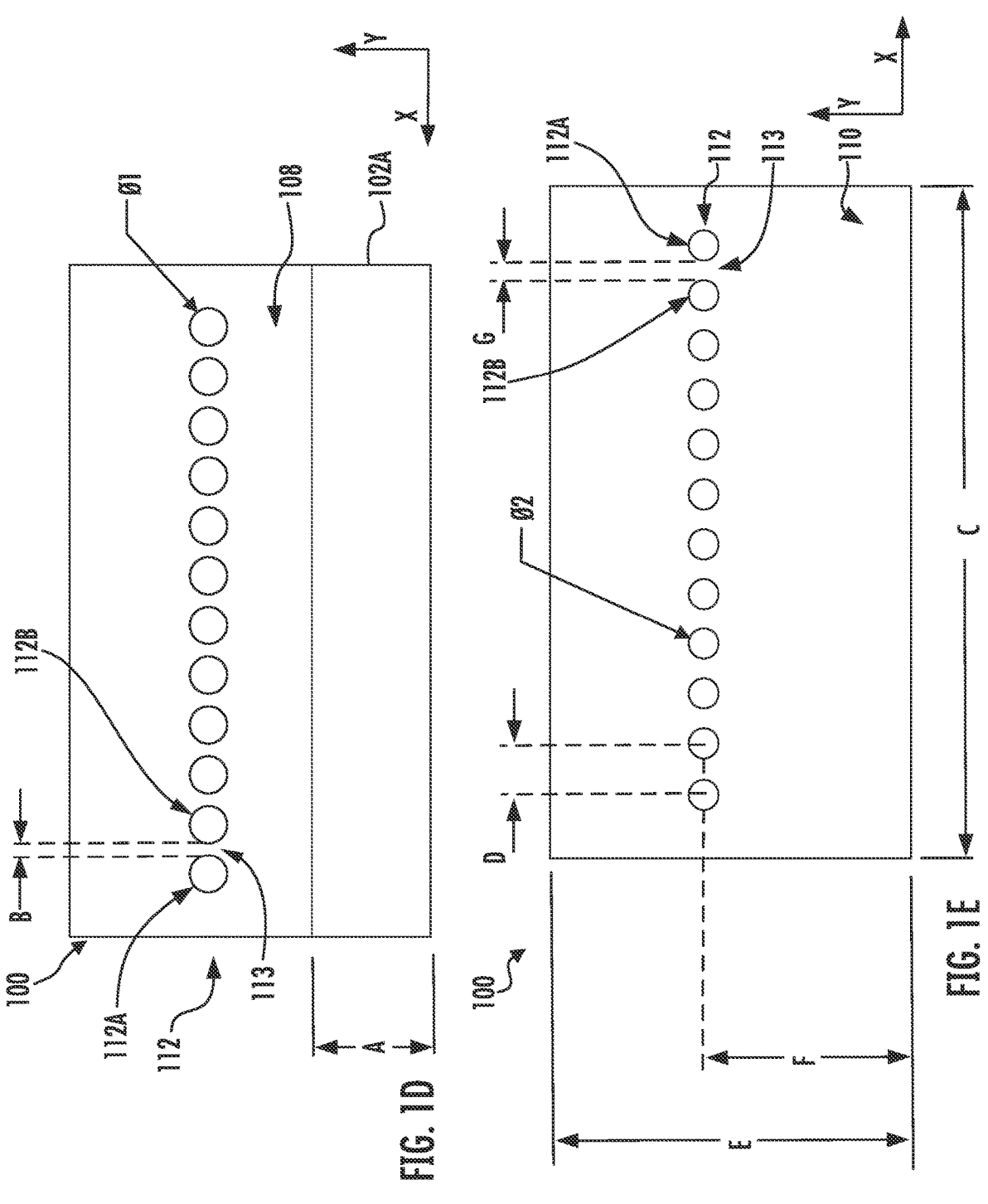

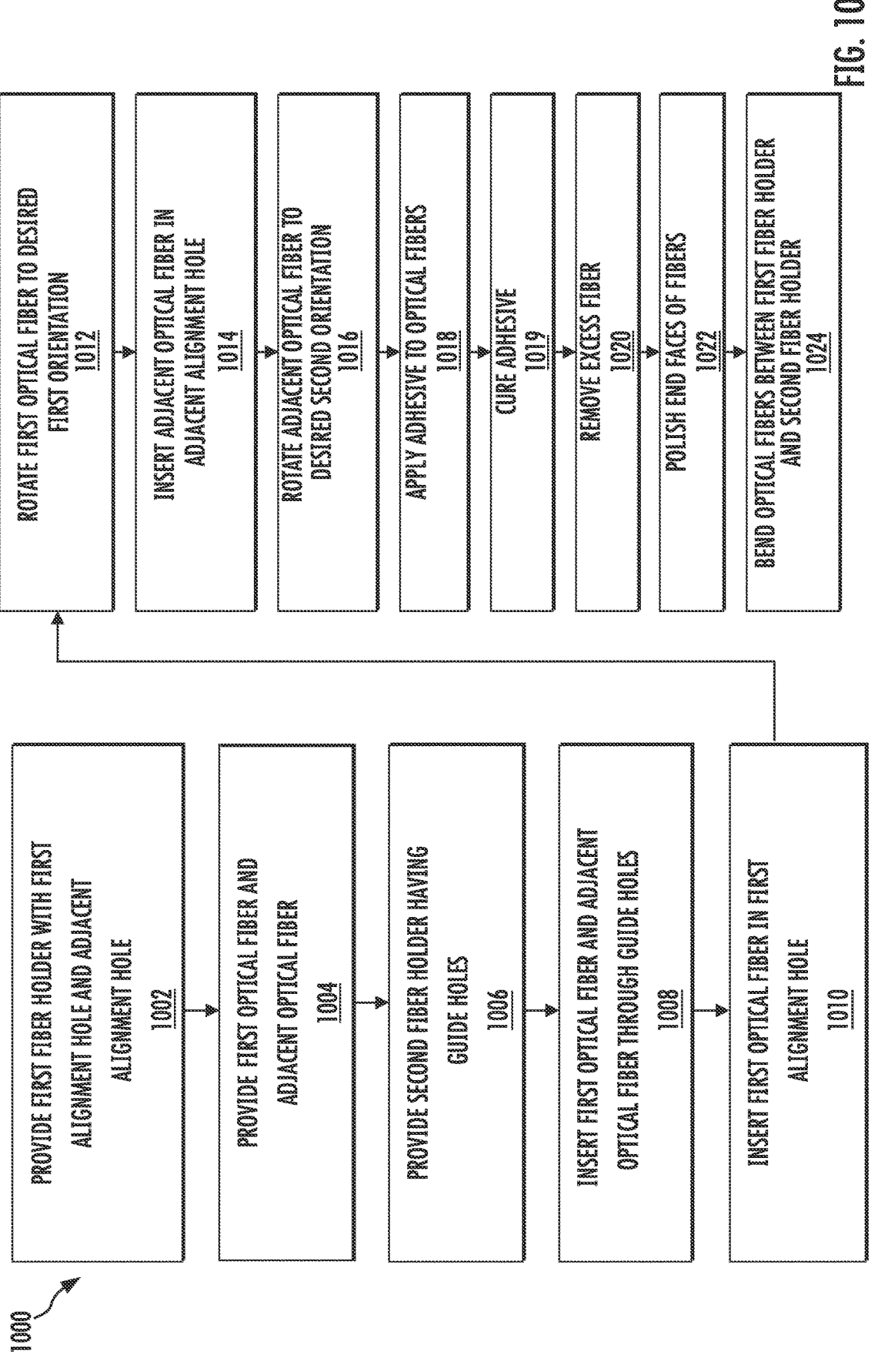

FIG. 10

PROVIDE FIRST FIBER HOLDER WITH FIRST ALIGNMENT HOLE AND ADJACENT ALIGNMENT HOLE
1002

PROVIDE FIRST OPTICAL FIBER AND ADJACENT OPTICAL FIBER
1004

PROVIDE SECOND FIBER HOLDER HAVING GUIDE HOLES
1006

INSERT FIRST OPTICAL FIBER AND ADJACENT OPTICAL FIBER THROUGH GUIDE HOLES
1008

INSERT FIRST OPTICAL FIBER IN FIRST ALIGNMENT HOLE
1010

ROTATE FIRST OPTICAL FIBER TO DESIRED FIRST ORIENTATION
1012

INSERT ADJACENT OPTICAL FIBER IN ADJACENT ALIGNMENT HOLE
1014

ROTATE ADJACENT OPTICAL FIBER TO DESIRED SECOND ORIENTATION
1016

APPLY ADHESIVE TO OPTICAL FIBERS
1018

CURE ADHESIVE
1019

REMOVE EXCESS FIBER
1020

POLISH END FACES OF FIBERS
1022

BEND OPTICAL FIBERS BETWEEN FIRST FIBER HOLDER AND SECOND FIBER HOLDER
1024

1000

1100

PROVIDE A SUBSTRATE
1102

ATTACH A FIRST PIECE OF THE SUBSTRATE
TO A SECOND PIECE OF THE SUBSTRATE
1104

LASER DRILL A FIRST ALIGNMENT HOLE
1106

LASER DRILL AN ADJACENT ALIGNMENT
HOLE
1108

FIBER HOLDERS AND ASSOCIATED METHODS FOR MAINTAINING RELATIVE ORIENTATION OF FIBERS THEREIN

CROSS-REFERENCE TO RELATED APPLICATION

This application claims priority to U.S. Patent Application No. 63/302,770, filed Jan. 25, 2022, which is incorporated herein by reference in its entirety.

FIELD

Embodiments of the present disclosure relate to fiber holders for holding fibers in an array for alignment of the fibers.

BACKGROUND

Fiber v-grooves are traditionally designed with a groove pattern open on the top of a block. Fibers may be placed in the v-grooves, and a cap may be fitted on top of the fibers and secured to the block. In this way, the fibers may be retained in the v-grooves. The process of assembling and positioning fibers is relatively straightforward where the orientation of the fiber (e.g., rotational alignment) is not a concern. However, with newer fiber technologies, such as multi-core fibers and polarization maintaining fibers, rotational alignment must also be accomplished. Fiber optic technicians struggle to rotationally align the fibers to the tight tolerances required to minimize losses at the connection interface.

Current manual processes to assemble v-grooves with more than one multi-core fiber have been hindered by the ability to align multiple fibers simultaneously. For example, the rotation of one fiber frequently disturbs the position and/or orientation of the cap or other fibers, which then requires realignment of those components. Thus, where rotational alignment is a requirement, the efficiency of assembly is low where blocks having v-grooves are utilized.

SUMMARY

Various embodiments of the present disclosure relate generally to providing fiber holders that aid in maintaining relative orientation of the fibers (e.g. optical fibers) during installation within the fiber holder. In some embodiments, alignment holes may be formed in a solid material, such as through laser drilling. Notably, by using techniques such as laser drilling, alignment holes may be formed with precision. The alignment holes may be created with walls maintained between consecutive, adjacent alignment holes so as to allow a stripped fiber section of one fiber to be rotated in an alignment hole without disturbing the position and/or orientation of another stripped fiber section of another fiber in an adjacent alignment hole. These alignment holes are beneficial for multi-core fibers (MCFs) and polarization maintaining fibers (PMFs), which both must be maintained at a specific rotational orientation. Where several MCFs or PMFs are installed in an array of alignment holes, the ability to rotate one fiber without affecting an adjacent fiber greatly increases the efficiency of installation.

An assembly method is provided for the installation of fibers in fiber holders. The process allows for rotation and fixing of individual fibers until the desired number of fibers are assembled—in their desired orientation.

In an example embodiment, a system is provided for maintaining relative orientation of at least two fibers in an array. The system includes the at least two fibers extending parallel in a same direction along a Z-axis, and the at least two fibers includes a first fiber and an adjacent fiber. At least a portion of each of the at least two fibers is stripped to remove an outer coating from each of the at least two fibers so that at least two stripped fiber sections are provided. The system also includes a fiber holder comprising a first surface and a second surface. Additionally, the system includes at least two alignment holes that are configured to receive the at least two stripped fiber sections. The at least two alignment holes extend from the first surface to the second surface, and the at least two alignment holes includes a first alignment hole configured to receive a stripped fiber section of the first fiber and an adjacent alignment hole configured to receive a stripped fiber section of the adjacent fiber. The system also includes a wall. The wall separates the first alignment hole and the adjacent alignment hole, and the wall is configured to permit rotation of the stripped fiber section of the adjacent fiber in the adjacent alignment hole without causing rotation of the stripped fiber section of the first fiber in the first alignment hole.

In some embodiments, the at least two fibers may be multi-core fibers. In some embodiments, the wall may define a minimum width of at least 20 microns. In some embodiments, the first alignment hole may have a first cross-sectional size at the first surface, and the first alignment hole may have a second cross-sectional size at the second surface. The first cross-sectional size may be larger than the second cross-sectional size. In some embodiments, the first alignment hole may be configured to hold only one stripped fiber section of a fiber therein.

In some embodiments, the stripped fiber section of the first fiber may have a diameter. The first alignment hole may have a hole diameter defined at the second surface, and the hole diameter may exceed the diameter of the stripped fiber section of the first fiber by two microns or less. In some related embodiments, the hole diameter may exceed the diameter of the stripped fiber section of the first fiber by 0.5 microns or less.

In some embodiments, the first alignment hole may be formed by laser drilling. In some related embodiments, the first alignment hole may be formed by laser drilling from the first surface towards the second surface and also by laser drilling from the second surface towards the first surface. In other related embodiments, the first alignment hole may have a circular, oval, rectangular, rectilinear, hexagonal, or triangular cross-sectional shape.

In some embodiments, the fiber holder may be integrally formed as a single component. In other embodiments, the fiber holder may comprise two or more pieces including a first piece and a second piece. A support surface may be provided on the first piece, and the at least two alignment holes may be provided on the second piece. The first piece and the second piece may be attached together. In some related embodiments, the fiber holder may comprise a third piece. The third piece may include a first surface and a second surface. The third piece may also include at least two additional alignment holes extending from the first surface of the third piece to the second surface of the third piece, and the at least two additional alignment holes may include a first additional alignment hole. The second piece and the third piece may be configured to be attached adjacent to each other so that the first alignment hole and the first additional alignment hole are axially aligned. In other related embodiments, the support surface may be curved.

In another example embodiment, a fiber holder for maintaining relative orientation of at least two fibers is provided. The fiber holder includes a first surface and a second surface. The fiber holder also includes at least two alignment holes that are configured to receive at least two stripped fiber sections of the at least two fibers. The at least two alignment holes extend from the first surface to the second surface, and the at least two alignment holes includes a first alignment hole configured to receive a stripped fiber section of a first fiber of the at least two fibers and an adjacent alignment hole configured to receive a stripped fiber section of an adjacent fiber of the at least two fibers. The adjacent fiber is adjacent to the first fiber. The fiber holder also includes a wall. The wall separates the first alignment hole and the adjacent alignment hole, and the wall is configured to permit rotation of the stripped fiber section of the adjacent fiber in the adjacent alignment hole without causing rotation of the stripped fiber section of the first fiber in the first alignment hole. In some example embodiments, the at least two fibers may be multi-core fibers.

In another example embodiment, a fiber holder is provided that is produced by a process of providing a substrate having a first side and a second side; laser drilling a first alignment hole from the first side of the substrate towards the second side of the substrate; and laser drilling an adjacent alignment hole adjacent to the first alignment hole. A wall is maintained between the first alignment hole and the adjacent alignment hole, and the wall has a minimum width of at least 20 microns.

In some embodiments, the substrate may comprise two or more pieces including a first piece and a second piece, and the fiber holder may be further produced by the process of attaching the first piece to the second piece; and laser drilling the first alignment hole and the adjacent alignment hole in the second piece.

In some embodiments, the fiber holder may be further produced by the process of laser drilling a first alignment hole. A first portion of the first alignment hole may be manufactured by laser drilling from the first surface towards the second surface, and a second portion of the first alignment hole may be manufactured by laser drilling from the second surface towards the first surface.

In some embodiments, the fiber holder may have a first surface and a second surface. The first alignment hole and the adjacent alignment hole may extend from the first surface to the second surface, and the first alignment hole may be configured to receive a stripped fiber section of a first fiber and the adjacent alignment hole may be configured to receive a stripped fiber section of an adjacent fiber. The adjacent fiber may be adjacent to the first fiber. The fiber holder may also include a wall. The wall may separate the first alignment hole and the adjacent alignment hole, and the wall may be configured to permit rotation of the stripped fiber section of the adjacent fiber in the adjacent alignment hole without causing rotation of the stripped fiber section of the first fiber in the first alignment hole.

In another example embodiment, a method of installing fibers is provided. The method includes providing a first fiber holder. The first fiber holder includes a first surface and a second surface and at least two alignment holes. The at least two alignment holes extend from the first surface to the second surface. The at least two alignment holes includes a first alignment hole and an adjacent alignment hole. The first fiber holder also includes a wall separating the first alignment hole and the adjacent alignment hole. The method also includes providing at least two fibers, and the at least two fibers includes a first fiber having a stripped fiber section and an adjacent fiber having a stripped fiber section. The method also includes inserting the stripped fiber section of the first fiber into the first alignment hole; rotating the stripped fiber section of the first fiber to a desired first orientation; inserting the stripped fiber section of the adjacent fiber into the adjacent alignment hole; and rotating the stripped fiber section of the adjacent fiber to the desired second orientation. The wall may be configured to permit rotation of the stripped fiber section of the adjacent fiber in the adjacent alignment hole without causing rotation of the stripped fiber section of the first fiber in the first alignment hole.

In some embodiments, the method may also include providing a second fiber holder having at least two guide holes; inserting the at least two fibers through the guide holes; and, after the at least two fibers have been inserted through the guide holes of the second fiber holder and after the stripped fiber sections of the at least two fibers have been inserted in the at least two alignment holes of the first fiber holder, bending the at least two fibers between the first fiber holder and the second fiber holder to generate a curvature in the at least two fibers.

In some embodiments, after the stripped fiber section of the first fiber has been rotated to the desired first orientation and after the stripped fiber section of the adjacent fiber has been rotated to the desired second orientation, adhesive may be applied to the at least two fibers.

In some embodiments, any excess fiber is removed from the at least two fibers that extends past the second surface of the first fiber holder. In some related embodiments, end faces of the at least two fibers may be polished.

Further areas of applicability of the present disclosure will become apparent from the detailed description provided hereinafter. It should be understood that the detailed description and specific examples, while indicating example preferred embodiments of the invention, are intended for purposes of illustration only and are not intended to limit the scope of the invention.

BRIEF DESCRIPTION OF THE DRAWINGS

The present disclosure will become more fully understood from the detailed description and the accompanying drawings, which are not necessarily to scale, wherein:

FIG. 1D is a front view illustrating the example fiber holder of FIG. 1A, in accordance with some embodiments discussed herein;

FIG. 1E is a rear view illustrating the example fiber holder of FIG. 1A, in accordance with some embodiments discussed herein;

FIG. 10 is a flow chart illustrating an example method for installing fibers, in accordance with some embodiments discussed herein.

DETAILED DESCRIPTION

The following description of the embodiments of the present disclosure is merely exemplary in nature and is in no way intended to limit the invention, its application, or uses. The following description is provided herein solely by way of example for purposes of providing an enabling disclosure but does not limit the scope or substance of the invention.

Figure 1A:
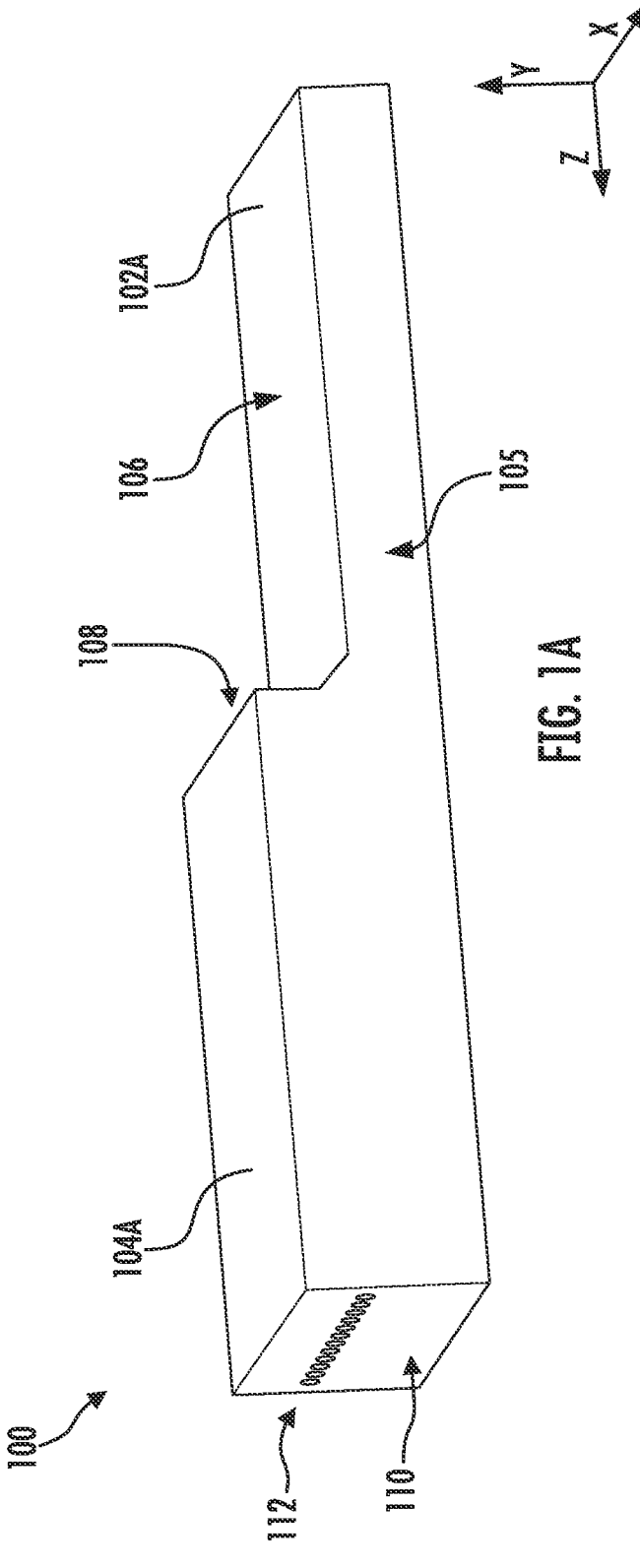
FIG. 1A is a perspective view illustrating an example fiber holder for maintaining the relative orientation of fibers, in accordance with some embodiments discussed herein.
Figure 1B:
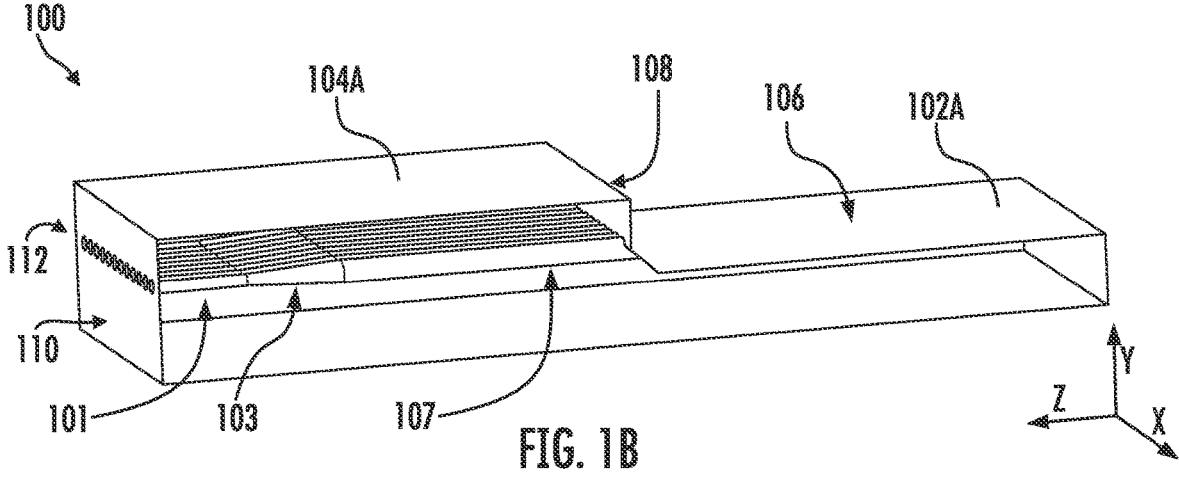
FIG. 1B is a perspective view illustrating the fiber holder of FIG. 1A where the side surface is made transparent for the purposes of illustration, in accordance with some embodiments discussed herein.
Figure 1C:
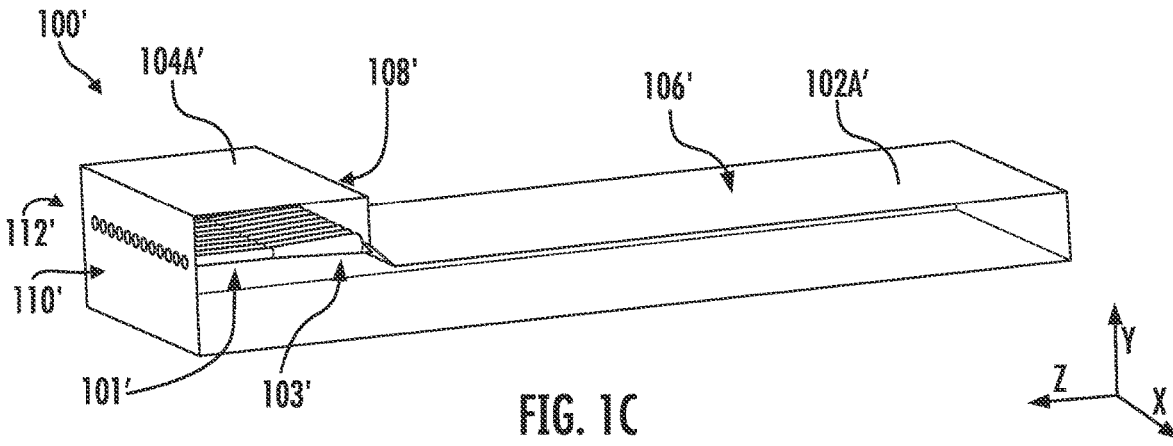
FIG. 1C is a perspective view illustrating another example fiber holder where the side surface is made transparent for the purposes of illustration, in accordance with some embodiments discussed herein.

In some embodiments, a fiber holder may be provided as a simple monolithic solid. Examples of such fiber holders are illustrated in FIGS. 1A-1C. FIG. 1A is a perspective view illustrating an example fiber holder 100 for maintaining the relative orientation of fibers, and FIG. 1B is a perspective view illustrating the fiber holder 100 of FIG. 1A where the side surface 105 is made transparent for the purposes of illustration. Additionally, FIG. 1C is a perspective view illustrating another example fiber holder 100 where the side surface 105 is made transparent for the purposes of illustration.

Looking first at FIG. 1A, various features of the fiber holder 100 may be seen. As illustrated in FIG. 1A, the fiber holder 100 may be provided as a single, integral piece, and the fiber holder 100 may have a lower portion 102A and an upper portion 104A. However, the fiber holder 100 may comprise multiple pieces that are attached together in some embodiments.

A support surface 106 may be provided on the lower portion 102A. This support surface 106 may provide support to fibers and/or stripped fiber sections. Additionally, alignment holes 112 may be defined in the upper portion 104A. The upper portion 104A may have a first surface 108 and a second surface 110, and the alignment holes 112 may extend from the first surface 108 to the second surface 110. The alignment holes 112 may each be configured to receive a stripped fiber section of a single fiber, and this fiber may be a multi-core fiber in some embodiments.

The alignment holes 112 may be formed by laser drilling. In many embodiments, the first alignment hole 112A may be formed by (i) laser drilling from the first surface 108 towards the second surface 110 or (ii) by laser drilling from the second surface 110 towards the first surface 108. Laser drilling may occur in either direction to obtain the desired shape and length for the alignment holes 112. However, in some embodiments, laser drilling may be performed in two directions to create alignment holes. For example, the first alignment hole 112A (shown in FIG. 1D) may be partially formed by laser drilling from the first surface 108 towards the second surface 110, and the first alignment hole 112A (FIG. 1D) may also be partially formed by laser drilling from the second surface 110 towards the first surface 108. Drilling in two directions may be beneficial to generate alignment holes 112 having greater lengths. Through laser drilling, the alignment holes 112 may be formed with a variety of shapes. For example, the first alignment hole 112A may be drilled so that it has a circular, oval, rectangular, rectilinear, or triangular cross-sectional shape. Additionally, alignment holes 112 may be formed with sharp or rounded corner radii. In some embodiments, the fiber holder 100 may be provided with a footprint that is similar to V-groove previously used.

Looking now at FIG. 1B, the cross-sections of the alignment holes 112 are visible. As illustrated, the alignment holes 112 may have a first section 101, a second section 103, and a third section 107. In the illustrated embodiment, the first section 101 and the third section 107 both have a generally uniform cross-section (subject to minor deviations for mechanical tolerances), but these sections may have non-uniform cross-sections in some embodiments. Additionally, the second section 103 may be tapered so that the cross-section increases in size as the second section 103 extends from the first section 101 to the third section 107. In other embodiments, the cross-sectional size of the alignment holes 112 may change at any point between the first surface 108 and the second surface 110, and the change in cross-sectional size may occur gradually across the entire length of the alignment holes 112 in some embodiments. The length of the upper portion 104A from the first surface 108 to the second surface 110 may be 1 millimeter to 5 millimeters in some embodiments, but other lengths may be used.

Turning now to FIG. 1C, an alternative fiber holder 100' is illustrated. Similar to the fiber holder 100 of FIG. 1B, the alternative fiber holder 100' of FIG. 1C may have a lower portion 102A' with a support surface 106', an upper portion 104A' having a first surface 108' and a second surface 110', and alignment holes 112A' extending from the first surface 108' to the second surface 110'. While the overall lengths of the fiber holder 100 and the alternative fiber holder 100' along the Z-axis may be approximately the same, the alternative fiber holder 100' may have an upper portion 104A' that is shorter than the upper portion 104A of the fiber holder 100 along the Z-axis. The length of the upper portion 104A' along the Z-axis may be 0.5 millimeters to 2.0 millimeters in some embodiments. Additionally, the alignment holes 112A' of the alternative fiber holder 100' may have only a first section 101' and a second section 103'.

Figure 1F:
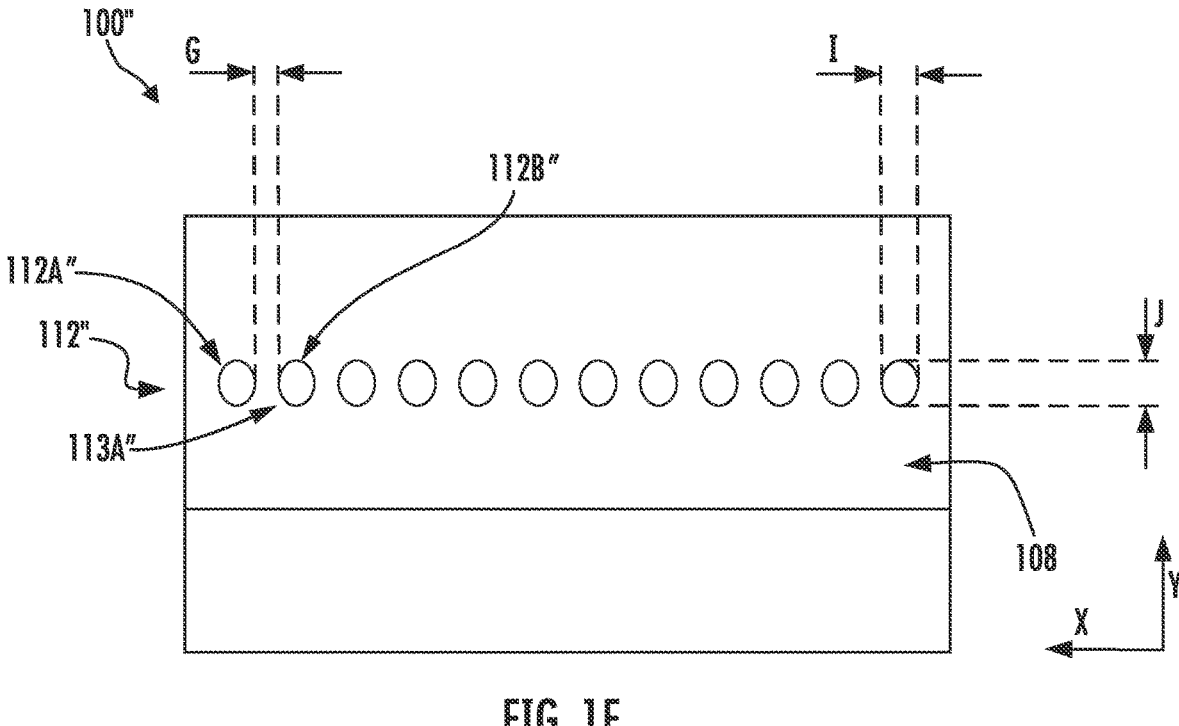
FIG. 1F is a front view illustrating an alternative fiber holder, in accordance with some embodiments discussed herein.

Example dimensions for the fiber holder 100 and for an alternative fiber holder 100'' are illustrated in FIGS. 1D-1F. FIG. 1D is a front view illustrating the example fiber holder 100 of FIG. 1A, and FIG. 1E is a rear view illustrating the example fiber holder 100 of FIG. 1A. Looking first at FIG. 1D, the lower portion 102A is illustrated, and this lower portion 102A may have a height A. The height A may range from 0.5 millimeters to 2 millimeters in some embodiments. Height A may be the height of the lower portion 102A of the fiber holder 100 when the fiber holder 100 is oriented as illustrated in FIG. 1D.

Additionally, the first surface 108 of the fiber holder 100 and a plurality of alignment holes 112 defined in the first surface 108 are illustrated in FIG. 1D. The alignment holes 112 may be provided in an array having a pattern. For example, alignment holes 112 may be provided in a 1×1 array, a 1×N array, an N×1 array, or an N×M array. In the illustrated embodiment, a 1×12 array is provided in the fiber holder 100.

In the illustrated embodiment, these alignment holes 112 share the same diameter, and this may be the first diameter Ø1. This first diameter Ø1 may be approximately 225 microns in some embodiments, but other sizes may be used. The first diameter Ø1 may be oversized relative to the diameter of the stripped fiber sections of the fibers so that stripped fiber sections may be easily inserted into the alignment holes 112 at the first surface.

In some embodiments, the first diameter Ø1 may be smaller than the diameter of a fiber with outer coating (e.g. sections of the fiber that are not stripped). In this way, stripped fiber sections may be inserted into the alignment holes 112 until the outer coating (see, e.g., FIG. 6D, 626) of fibers comes in contact with the first surface 108. This may provide a strain-relief system that permits better control of the amount of excess fibers (see, e.g., FIG. 6A, 648) protruding past the second surface 110 of the fiber holder 100. This may also constrain the movement of fibers in the longitudinal direction (e.g. about the Z-axis in FIG. 6C) of the fibers. Once in the desired orientation is obtained, adhesive may be applied to the fibers to maintain this orientation.

Additionally, a first alignment hole 112A and an adjacent alignment hole 112B are illustrated in FIG. 1D. A wall 113 may be provided between the first alignment hole 112A and an adjacent alignment hole 112B to separate the two holes. The wall 113 may be configured to permit rotation of a stripped fiber section of a first fiber in the first alignment hole 112A without causing rotation of a stripped fiber section of an adjacent fiber in the adjacent alignment hole 112B. Similarly, the wall 113 may be configured to permit rotation of the stripped fiber section of the adjacent fiber in the adjacent alignment hole 112B without causing rotation of the stripped fiber section of the first fiber in the first alignment hole 112A. The wall 113 may have a width B at the first surface 108. In some embodiments, the minimum width B may be the smallest size that may be used while maintaining the mechanical strength of the wall 113. In some embodiments, the width B may range from 20 microns to 125 microns. In some embodiments, the width B may range from 50 microns to 100 microns. However, other widths may be used. The width B may be measured between the two extreme tips of adjacent alignment holes 112 as illustrated in FIG. 1D.

Looking now at FIG. 1E, the second surface 110 of the fiber holder 100 and features on the second surface 110 are visible. The alignment holes 112 may share the same diameter at the second surface 110, and this may be the second diameter Ø2. This second diameter Ø2 may be approximately 125.5 microns in some embodiments. However, other larger diameters (e.g. 127 microns) may be used for the second diameter Ø2 in some embodiments. In some embodiments, the second diameter Ø2 may exceed a diameter of a stripped fiber section of a first fiber by two microns or less (e.g. where the diameter of the stripped fiber section is 125 microns and the second diameter Ø2 is 127 microns). In some embodiments, the second diameter Ø2 may even exceed the diameter of the stripped fiber section of the first fiber by 0.6 microns or less (e.g. where the diameter of the stripped fiber section is 125 microns and the second diameter Ø2 is 125.6 microns). By providing only a small amount of clearance in these alignment holes 112 at the second surface 110, the position and orientation of stripped fiber sections may be more easily maintained. This is especially beneficial for MCFs and PMFs, which require rotational alignment about the longitudinal axis of fibers. The orientation of fibers and/or the stripped fiber sections may also be maintained at other points along their length. The second diameter Ø2 may be smaller than the first diameter Ø1.

Additionally, the distance G may be the width of the wall 113 at the second surface 110. The width G may be measured between the two extreme tips of adjacent alignment holes 112 as illustrated in FIG. 1E. The wall 113 may have a width G at the second surface 110. In some embodiments, the minimum size for width G may be the smallest size that may be used while maintaining the mechanical strength of the wall 113. In some embodiments, the width G may range from 20 microns to 125 microns. In some embodiments, the width G may range from 50 microns to 100 microns. However, other widths may be used. This width G may be the minimum overall width of the wall 113.

FIG. 1E also illustrates other dimensions of the fiber holder 100. The distance C may be the width of the fiber holder 100. The distance C may range from 1.5 millimeters to 5 millimeters in some embodiments. In other embodiments, the distance C may range from 3 millimeters to 4 millimeters, or the distance C may be approximately 3.5 millimeters. In the embodiment illustrated in FIG. 1E, the distance C may be approximately 3.5 millimeters. Additionally, the pitch may be defined by the distance D, and this pitch D may be measured between the center points of two alignment holes 112 that are adjacent to each other. The pitch D may be approximately 250 microns in some embodiments, and this pitch D may be consistent throughout an array of alignment holes 112. Distance E may be the height of the fiber holder 100 when the fiber holder 100 is oriented as illustrated in FIG. 1E. The distance E may range from 1 millimeter to 3 millimeters in some embodiments, and the distance E may be approximately 2 millimeters in some embodiments. Furthermore, the distance F may define the distance from the bottom surface of the fiber holder 100 (when the fiber holder 100 is oriented as illustrated in FIG. 1E) to the center of the alignment holes 112. The distance F may range from 0.5 millimeters to 2 millimeters in some embodiments, and the distance F may be approximately 1 millimeter in some embodiments.

FIG. 1F is a front view illustrating an alternative fiber holder 100". This alternative fiber holder 100" is largely similar to the fiber holder 100 of FIG. 1D, but the alignment holes 112" have an oval shaped cross-section at the first surface 108. As the alignment holes 112" extend from the first surface 108 to the second surface 110, the alignment holes 112" may taper to a smaller size and a different shape. For example, the alignment holes 112" may have a circular cross-section at the second surface 110 similar to the alignment holes 112 of FIG. 1E. In some embodiments, the width I of the alignment holes 112" at the first surface 108 may be equal to the diameter Ø2 of the circular alignment holes 112 at the second surface 110, and the height J of the alignment holes 112" at the first surface 108 may be greater than the width I of the alignment holes 112" at the second surface 110. Thus, stripped fiber sections of fibers may be more easily inserted into the alignment holes 112" at the first surface 110, and the stripped fiber sections of fibers may still be retained tightly due to the narrower diameter of alignment holes 112" at the second surface 108.

The alternative fiber holder 100" may be beneficial in reducing the overall length of fiber array units (FAU) formed by assembly of the stripped fiber sections into the alignment holes 112. To reduce the overall length of FAUs, it may be preferable to allow at least part of the curved or helical fiber path of stripped fiber sections to extend within the alignment holes 112. To accommodate the curved or helical fiber, the cross-sectional size of alignment holes 112 may be enlarged. For example, some portion of the alignment holes 112 may be fabricated with an oval cross-section (as illustrated in FIG. F) or a rectangular cross-section in areas proximate to the first surface 108. This oval or rectangular cross-section may be oriented so that the height of the cross-section is greater than the width of the cross-section. For example, the height J of the oval cross-section is greater than the width I of the oval cross-section in FIG. 1F. The larger cross-sectional size (as illustrated in FIGS. 1D and 1F) may work like a funnel to simplify fiber array alignment to the alignment holes 112 during assembly. A larger cross-sectional size (as illustrated in FIGS. 1D and 1F) may be required to accommodate fiber buckling that may occur during rotational alignment. This fiber buckling is explained in greater detail in FIGS. 7A-7B and the corresponding text.

In the illustrated embodiment of FIG. 1F, the width I of the alignment holes 112 may be approximately 125.6 microns, the height J of alignment holes 112 may be approximately 225 microns, and the width G of the wall 113A" may be approximately 124.4 microns. However, fiber holders having other dimensions may also be utilized.

In some embodiments, fiber holders may be provided that comprise two or more separate pieces that are attached together. Multi-piece fiber holders may be advantageous to simplify the shape of the pieces that need to be manufactured. Additionally, in some embodiments, alignment holes may be drilled in one piece before the piece is fastened to another piece, and this may simplify the drilling process.

Figures 2A, 2B:
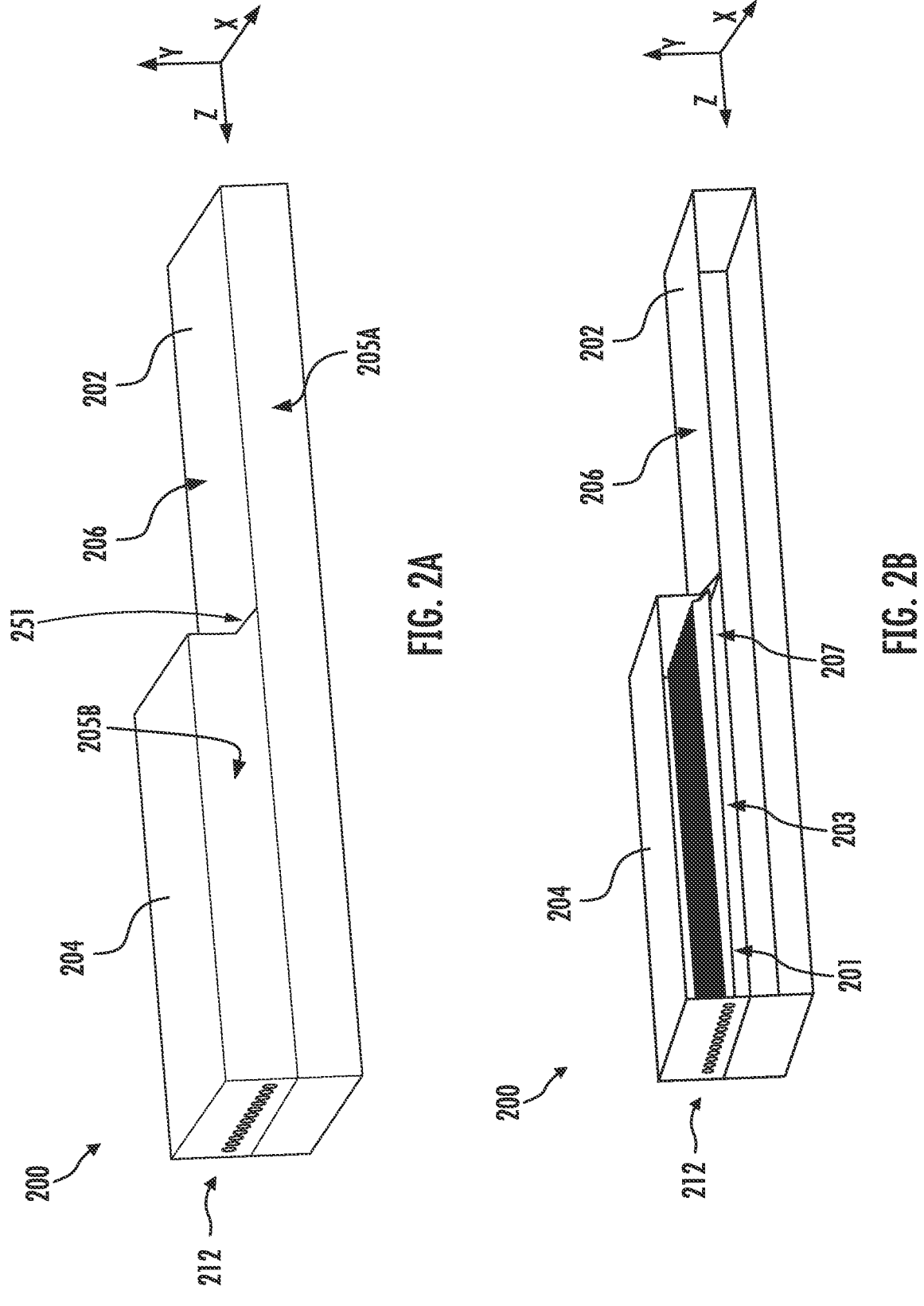
FIG. 2A is a perspective view illustrating another example fiber holder for maintaining the relative orientation of a fibers, in accordance with some embodiments discussed herein.
FIG. 2B is a perspective view illustrating the fiber holder of FIG. 2A where side surfaces are made transparent for the purposes of illustration, in accordance with some embodiments discussed herein.
Figure 2C:
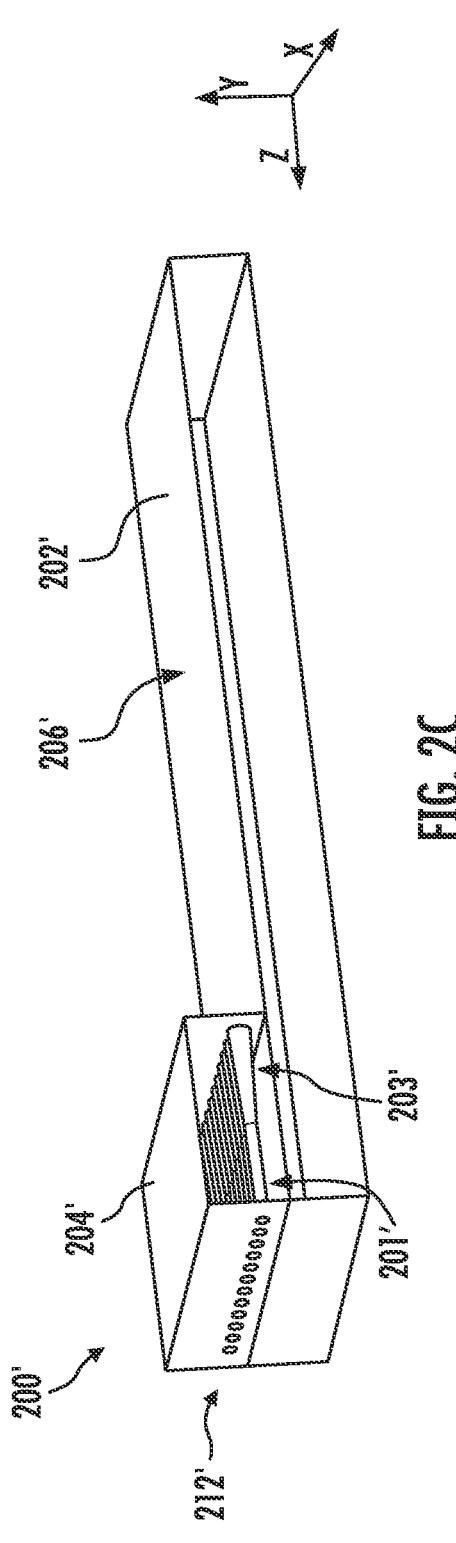
FIG. 2C is a perspective view illustrating another example fiber holder similar to the fiber holder of FIG. 2A where side surfaces are made transparent for the purposes of illustration, in accordance with some embodiments discussed herein.

The fiber holder 200 illustrated in FIG. 2A-2C is an example of a fiber holder 200 having two or more separate pieces. FIG. 2A is a perspective view illustrating the fiber holder 200 for maintaining the relative orientation of fibers, and FIG. 2B is a perspective view illustrating the fiber holder 200 of FIG. 2A where the side surfaces 205A and 205B are made transparent for the purposes of illustration. Additionally, FIG. 2C is a perspective view illustrating another example fiber holder 200' where the side surfaces are made transparent for the purposes of illustration.

Looking first at FIG. 2A, the fiber holder 200 is illustrated. This fiber holder 200 may have several features that are similar to the fiber holders 100, 100' discussed above. Like the fiber holders 100, 100', the fiber holder 200 may have a support surface 206 and alignment holes 212. However, the fiber holder 200 may be provided with a first piece 202 and a second piece 204 that are attached together. The support surface 206 may be provided on the first piece 202, and the alignment holes 212 may be provided in the second piece 204. In the embodiment of FIG. 2A, the first piece 202 extends for the entire length of the fiber holder 200 along the Z-axis, and the second piece 204 may rest above the first piece 202. Additionally, the first piece 202 may have a side surface 205A, and the second piece 204 may also have a side surface 205B.

In some embodiments, the first piece 202 or the second piece 204 may be fabricated, and then the other piece may be added onto the first piece 202 or the second piece 204. For example, the second piece 204 may be fabricated with the alignment holes 212 and other features provided, and then the first piece 202 may be added to the second piece 204. The first piece 202 may be added or grown onto the second piece 204 through three-dimensional printing or through other manufacturing approaches.

An angled region 251 may also be included in the second piece 204. This angled region 251 may extend past the remainder of the second piece 204. This angled region 251 may extend at a 45 degree angle, but other angles may be used as well. The angled region 251 may be beneficial to provide support for an optical fiber or a stripped fiber section as it extends from the support surface 206 of the first piece 202 to the alignment holes 212. While this angled region 251 is included in this embodiment, other embodiments (see, e.g., FIG. 2C) may be provided without this angled region 251.

Looking now at FIG. 2B, the cross-section of alignment holes 212 may be seen. Similar to the alignment holes 112 illustrated in FIG. 1B, the alignment holes 212 may have a first section 201, a second section 203, and a third section 207. In the illustrated embodiment, the first section 201 and the third section 207 both have a non-uniform cross-section, but these sections may have a generally uniform cross-section in some embodiments. Additionally, the second section 203 may be tapered so that the cross-sectional size of the holes increases as the second section 203 extends from the first section 201 to the third section 207. In other embodiments, the second section 203 may transition from a larger cross-sectional size to a smaller cross-sectional size in a stepwise manner with ring-shaped ledges provided at the internal surfaces of the alignment holes 212. The larger cross-sectional size at the third section 207 may work like a funnel to simplify fiber array alignment to the alignment holes 212 during assembly, and the smaller cross-sectional size at the first section 201 may assist in maintaining the position and/or orientation of stripped fiber sections in the alignment holes 212.

Turning now to FIG. 2C, an alternative fiber holder 200' is illustrated. Similar to the fiber holder 200 of FIG. 2B, the alternative fiber holder 200' of FIG. 2C may include a first piece 202' with a support surface 206' and a second piece 204' having alignment holes 212'. While the overall lengths of the fiber holder 200 and the alternative fiber holder 200' along the Z-axis may be approximately the same, the alternative fiber holder 200' may have a second piece 204' that is shorter than the second piece 204 of the fiber holder 200 along the Z-axis. The length of the second piece 204' along the Z-axis may be 0.5 millimeters to 2.0 millimeters in some embodiments. Additionally, the alignment holes 212' of the alternative fiber holder 200' may have only a first section 201' and a second section 203'.

Multi-piece fiber holders such as fiber holders 200, 200' may better facilitate laser drilling of holes. Further examples of multi-piece fiber holders are illustrated in subsequent figures and described below. With multi-piece fiber holders, laser drilling may be conducted in a mostly rectangular second piece (e.g. 204). In some embodiments, laser drilling may be performed to create alignment holes (e.g. 212) in the second pieces (e.g. 204), and then the second pieces (e.g. 204) may be attached to the first pieces (e.g. 202). By providing smaller pieces, laser drilling and/or other machining may be easier to perform. However, in other embodiments, the second pieces (e.g. 204) may be attached to the first pieces (e.g. 202), and then laser drilling may be performed to create alignment holes (e.g. 212) in the second pieces (e.g. 204)—this approach may be beneficial to prevent any adhesive used to attach separate pieces from flowing into alignment holes. Where multi-piece fiber holders are used such as 200, 200' (and where other multi-piece fiber holders described herein are used), the separate pieces may be assembled before, during, or after assembly of stripped fiber sections in the alignment holes 212.

Additionally, where multi-piece fiber holders are used such as 200, 200' (and where other multi-piece fiber holders described herein are used), the separate pieces (e.g. the first piece 202 and the second piece 204) may have textured, grooved, pocketed, or patterned surfaces at the interface between the separate pieces to aid with alignment and fastening of the pieces. This may be beneficial in more efficiently providing accurate positioning and orientation of the pieces.

Figure 2D:
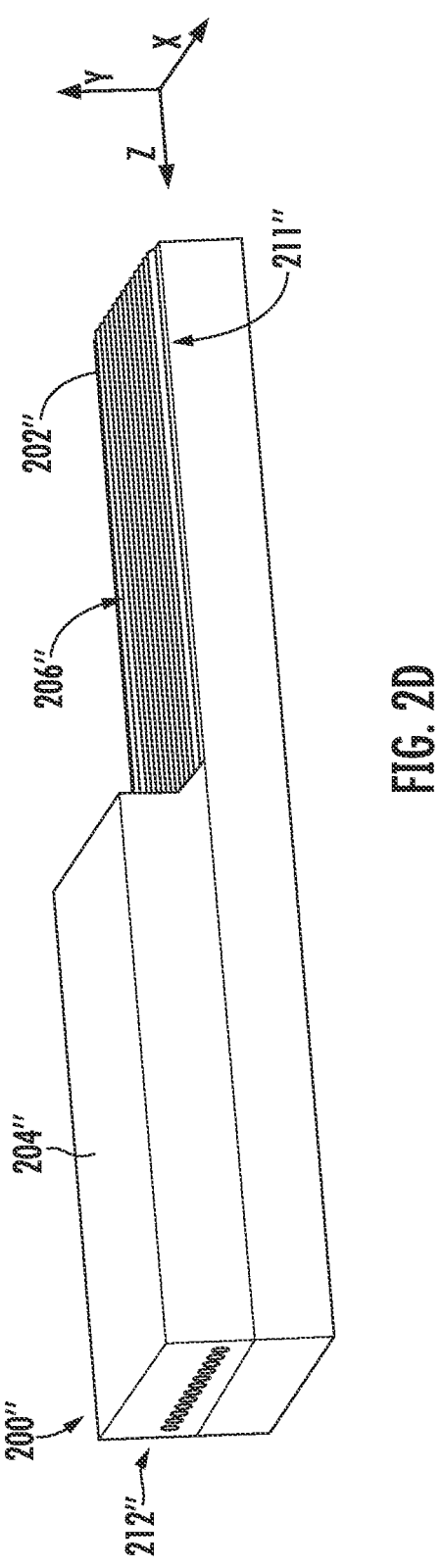
FIG. 2D is a perspective view illustrating another example fiber holder similar to the fiber holder of FIG. 2A, in accordance with some embodiments discussed herein.

In some embodiments, grooves may be provided in fiber holders to support optical fibers as the optical fibers extend towards alignment holes. FIG. 2D illustrates an example of this. In FIG. 2D, a fiber holder 200" is provided having a first piece 202" and a second piece 204". Similar to other embodiments discussed above, the second piece 204" may include alignment holes 212". In the fiber holder 200", the first piece 202" may have a support surface 206", and this support surface 206" may possess grooves 211". These grooves 211" may be sized so that optical fibers may be permitted to rest inside the grooves 211", and this may assist in positioning the optical fibers. Grooves 211" may take a wide variety of shapes (e.g. V-grooves, curved grooves, rectilinear grooves, circular grooves, etc.). Additionally, the grooves 211" may be configured to receive optical fibers with outer coating and/or stripped fiber sections.

Figures 3A, 3B:
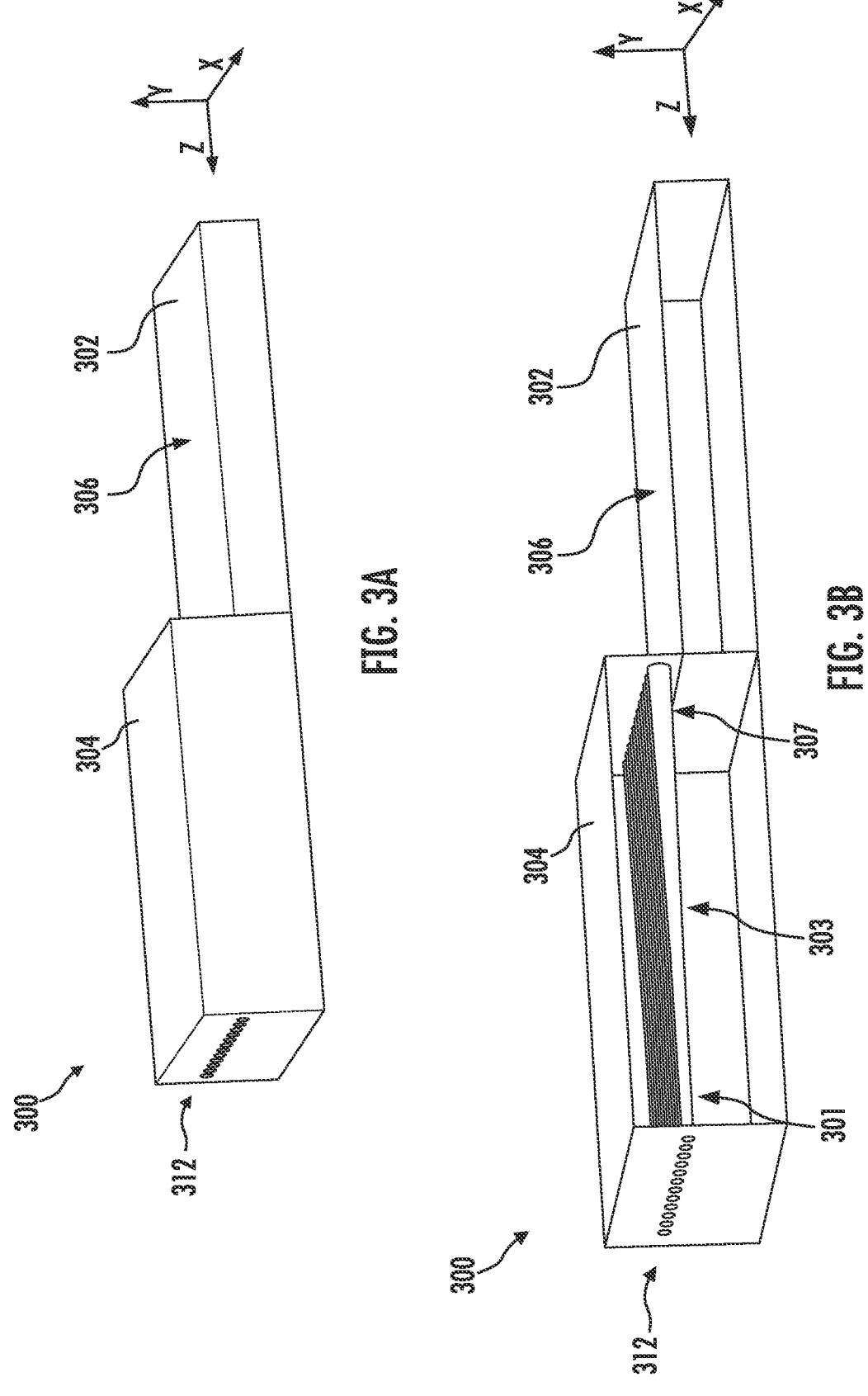
FIG. 3A is a perspective view illustrating another example fiber holder for maintaining the relative orientation of a fibers, in accordance with some embodiments discussed herein.
FIG. 3B is a perspective view illustrating the fiber holder of FIG. 3A where side surfaces are made transparent for the purposes of illustration, in accordance with some embodiments discussed herein.
Figures 3C, 4A:
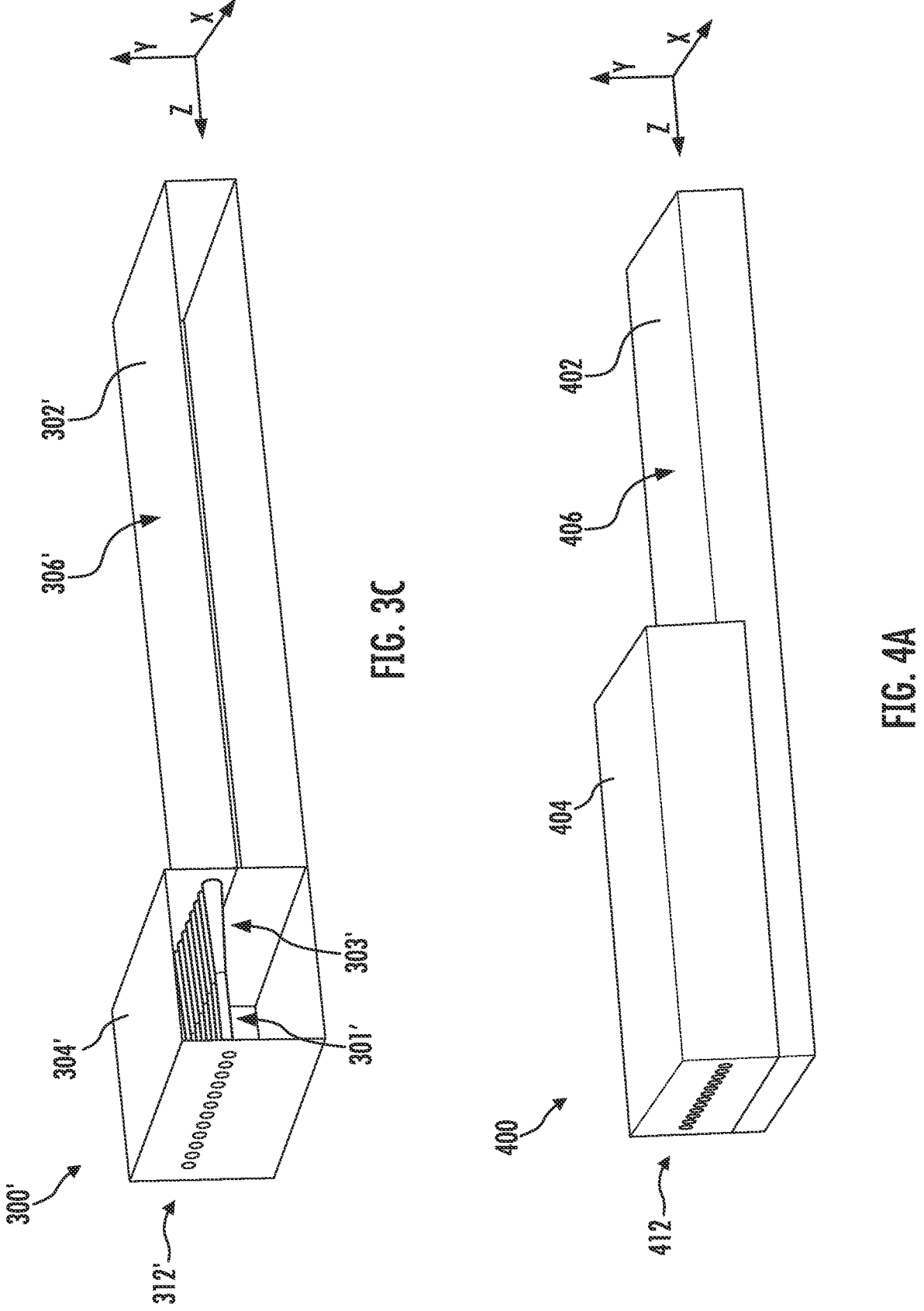
FIG. 3C is a perspective view illustrating another example fiber holder similar to the fiber holder of FIG. 3A where the side surfaces are made transparent for the purposes of illustration, in accordance with some embodiments discussed herein.
FIG. 4A is a perspective view illustrating another example fiber holder for maintaining the relative orientation of a fibers, in accordance with some embodiments discussed herein.

Other alternative multi-piece fiber holders may also be used, and examples of such fiber holders 300, 300' are illustrated in FIGS. 3A-3C. Fiber holders 300, 300' may have a relatively simple design, making the costs of manufacturing these separate pieces low.

FIG. 3A is a perspective view illustrating an example fiber holder 300 for maintaining the relative orientation of fibers, and FIG. 3B is a perspective view illustrating the fiber holder 300 of FIG. 3A where the side surface is made transparent for the purposes of illustration. Additionally, FIG. 3C is a perspective view illustrating another example fiber holder 300' where the side surface is made transparent for the purposes of illustration.

Looking first at FIG. 3A, the fiber holder 300 is illustrated. This fiber holder 300 may have several features that are similar to the fiber holder 200 discussed above. Like the fiber holder 200, the fiber holder 300 may have a first piece 302 and a second piece 304 that may be attached together. A support surface 306 may be provided on the first piece 302, and alignment holes 312 may be provided in the second piece 304. The first piece 302 and the second piece 304 may be provided side-by-side in the fiber holder 300 of FIG. 3A, and the two pieces may be connected at a vertical interface.

Looking now at FIG. 3B, the cross-section of alignment holes 312 may be seen. Similar to the alignment holes 212 illustrated in FIG. 2B, the alignment holes 312 may have a first section 301, a second section 303, and a third section 307. In the illustrated embodiment, the first section 301 and the third section 307 both have a non-uniform cross-section, but these sections may have a generally uniform cross-section in some embodiments. Additionally, the second section 303 may be tapered so that the cross-sectional size of holes increases as the second section 303 extends from the first section 301 to the third section 307. The larger cross-sectional size at the third section 307 may work like a funnel to simplify fiber array alignment to the alignment holes 312 during assembly, and the smaller cross-sectional size at the first section 301 may assist in maintaining the position and/or orientation of stripped fiber sections in the alignment holes 312.

Turning now to FIG. 3C, an alternative fiber holder 300' is illustrated. Similar to the fiber holder 300 of FIG. 3B, the alternative fiber holder 300' of FIG. 3C may have a first piece 302' with a support surface 306' and a second piece 304' having alignment holes 312'. While the overall lengths of the fiber holder 300 and the alternative fiber holder 300' along the Z-axis may be approximately the same, the alternative fiber holder 300' may have a second piece 304' that is shorter than the second piece 304 of the fiber holder 300 along the Z-axis. The length of the second piece 304' along the Z-axis may be 0.5 millimeters to 2.0 millimeters in some embodiments. Additionally, the alignment holes 312' of the alternative fiber holder 300' may have only a first section 301' and a second section 303'.

Figure 4B:
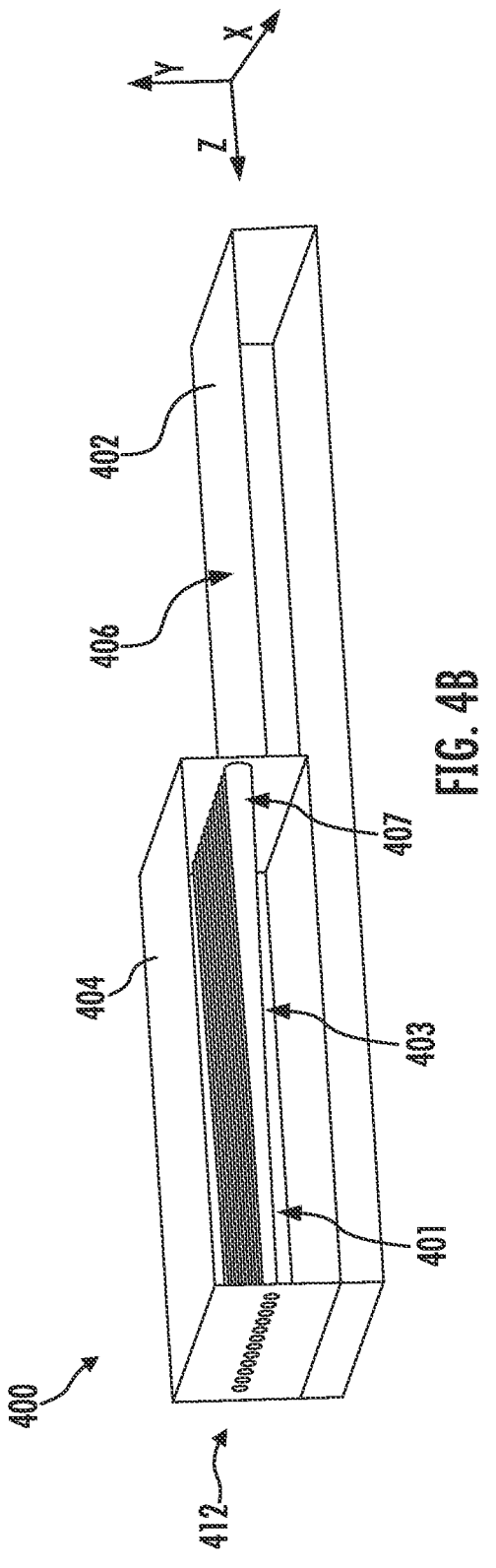
FIG. 4B is a perspective view illustrating the fiber holder of FIG. 4A where side surfaces are made transparent for the purposes of illustration, in accordance with some embodiments discussed herein.
Figure 4C:
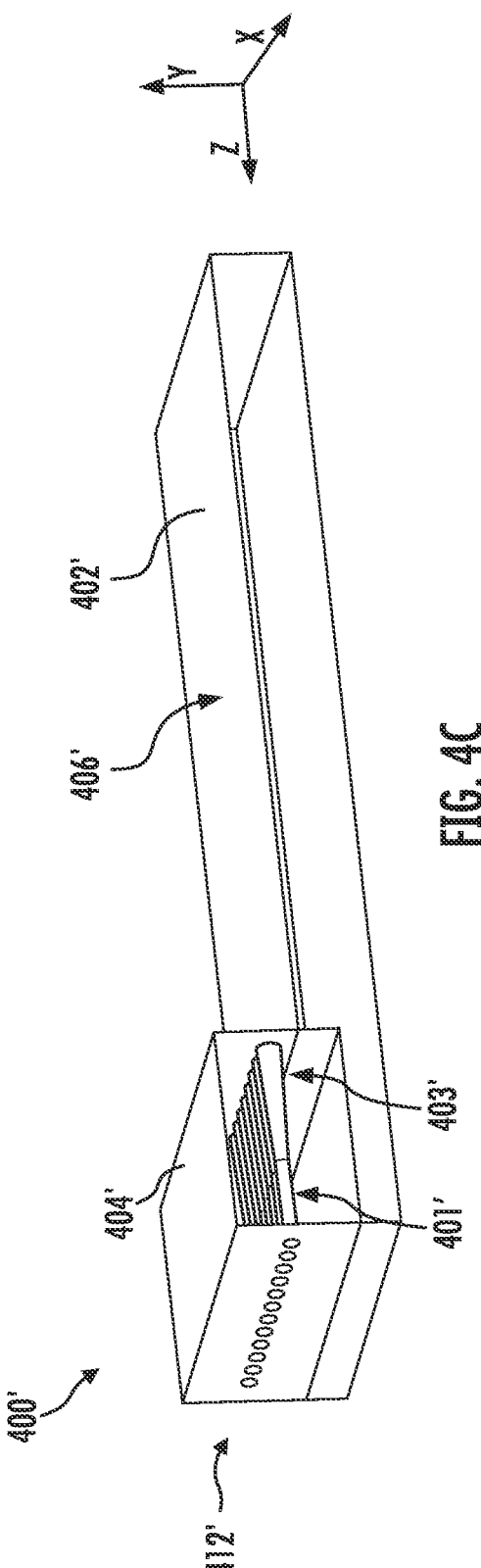
FIG. 4C is a perspective view illustrating another example fiber holder where the side surfaces are made transparent for the purposes of illustration, in accordance with some embodiments discussed herein.

FIGS. 4A-4C illustrate other multi-piece fiber holders 400, 400' that may be used. These fiber holders 400, 400' may have a high amount of surface area between the separate pieces as a vertical interface and a horizontal interface are provided, and this may permit pieces to be fastened together more securely.

FIG. 4A is a perspective view illustrating an example fiber holder 400 for maintaining the relative orientation of fibers, and FIG. 4B is a perspective view illustrating the fiber holder 400 of FIG. 4A where the side surface is made transparent for the purposes of illustration. In addition, FIG. 4C is a perspective view illustrating another example fiber holder 400' where the side surface is made transparent for the purposes of illustration.

Looking first at FIG. 4A, the fiber holder 400 is illustrated. This fiber holder 400 may have several features that are similar to the fiber holders 200, 300 discussed above. Like the fiber holders 200, 300, the fiber holder 400 may have a first piece 402 and a second piece 404 that may be attached together. A support surface 406 may be provided on the first piece 402, and alignment holes 412 may be provided in the second piece 404.

For the fiber holder 400, the second piece 404 may be configured to rest on the first piece 402, and a vertical interface and a horizontal interface may be provided between the two pieces. The surface area in contact between the first piece 402 and the second piece 404 may be increased by providing both a vertical interface and a horizontal interface, and this may permit two pieces to be fastened together more securely. Additionally, the provision of both a vertical interface and a horizontal interface may facilitate more efficient assembly and alignment of the two pieces.

Looking now at FIG. 4B, the cross-section of alignment holes 412 may be seen. Similar to the alignment holes 212, 312, the alignment holes 412 may have a first section 401, a second section 403, and a third section 407. In the illustrated embodiment, the first section 401 and the third section 407 both have a non-uniform cross-section, but these sections may have a generally uniform cross-section in some embodiments. Additionally, the second section 403 may be tapered so that the cross-sectional size of alignment holes 412 increases as the second section 403 extends from the first section 401 to the third section 407. The larger cross-sectional size at the third section 407 may work like a funnel to simplify fiber array alignment to the alignment holes 412 during assembly, and the smaller cross-sectional size at the first section 401 may assist in maintaining the position and/or orientation of stripped fiber sections in the alignment holes 412.

Turning now to FIG. 4C, an alternative fiber holder 400' is illustrated. Similar to the fiber holder 400 of FIG. 4B, the alternative fiber holder 400' of FIG. 4C may have a first piece 402' with a support surface 406' and a second piece 404' having alignment holes 412'. While the overall lengths of the fiber holder 400 and the alternative fiber holder 400' along the Z-axis may be approximately the same, the alternative fiber holder 400' may have a second piece 404' that is shorter than the second piece 404 of the fiber holder 400 along the Z-axis. The length of the second piece 404' along the Z-axis may be 0.5 millimeters to 2.0 millimeters in some embodiments. Additionally, the alignment holes 412' of the alternative fiber holder 400' may have only a first section 401' and a second section 403'.

Figures 5A, 5B:
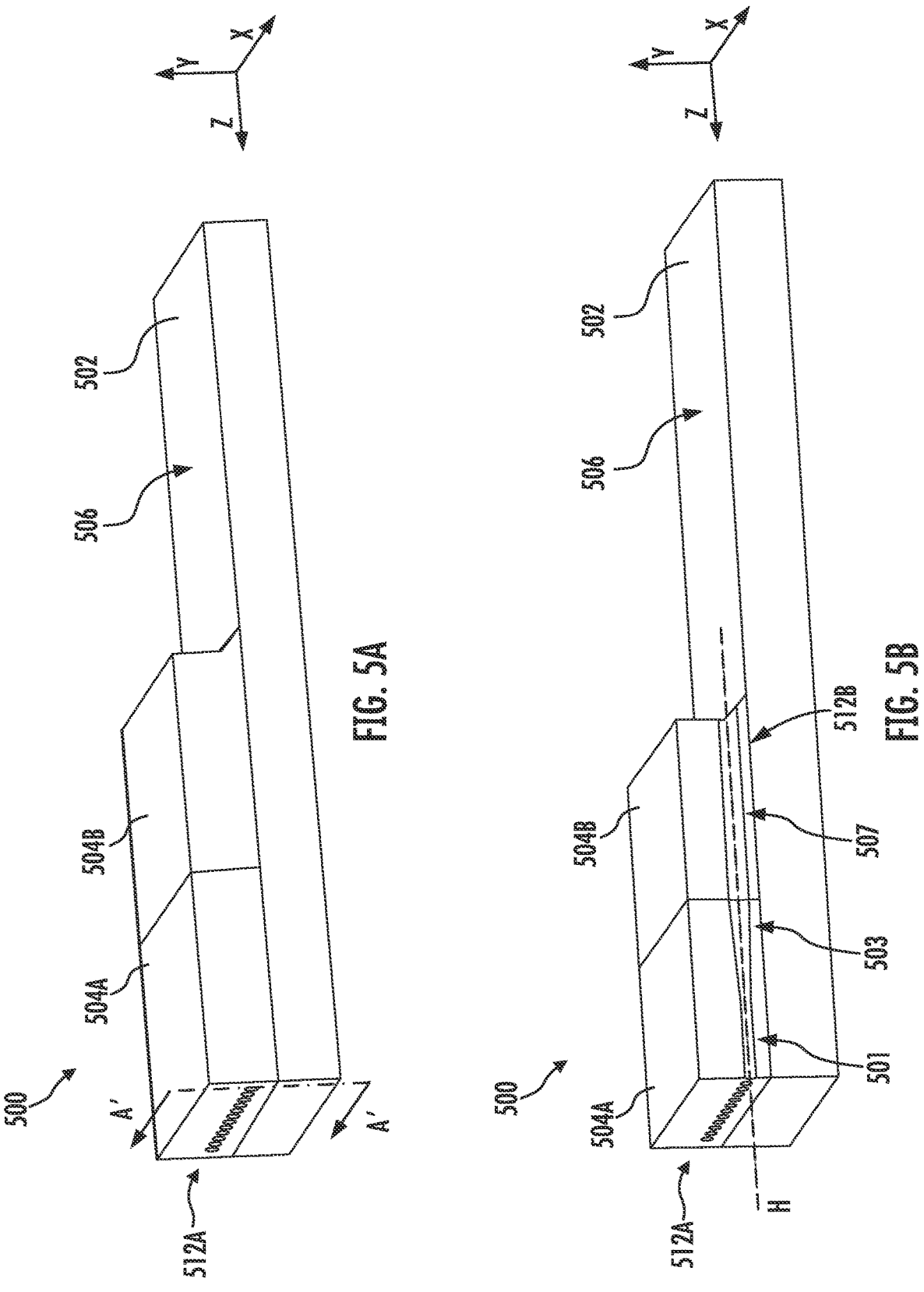
FIG. 5A is a perspective view illustrating another example fiber holder for maintaining the relative orientation of a fibers, in accordance with some embodiments discussed herein.
FIG. 5B is a cross-sectional view illustrating the fiber holder of FIG. 5A where the cross-section of an alignment hole is made visible, in accordance with some embodiments discussed herein.
Figure 5C:
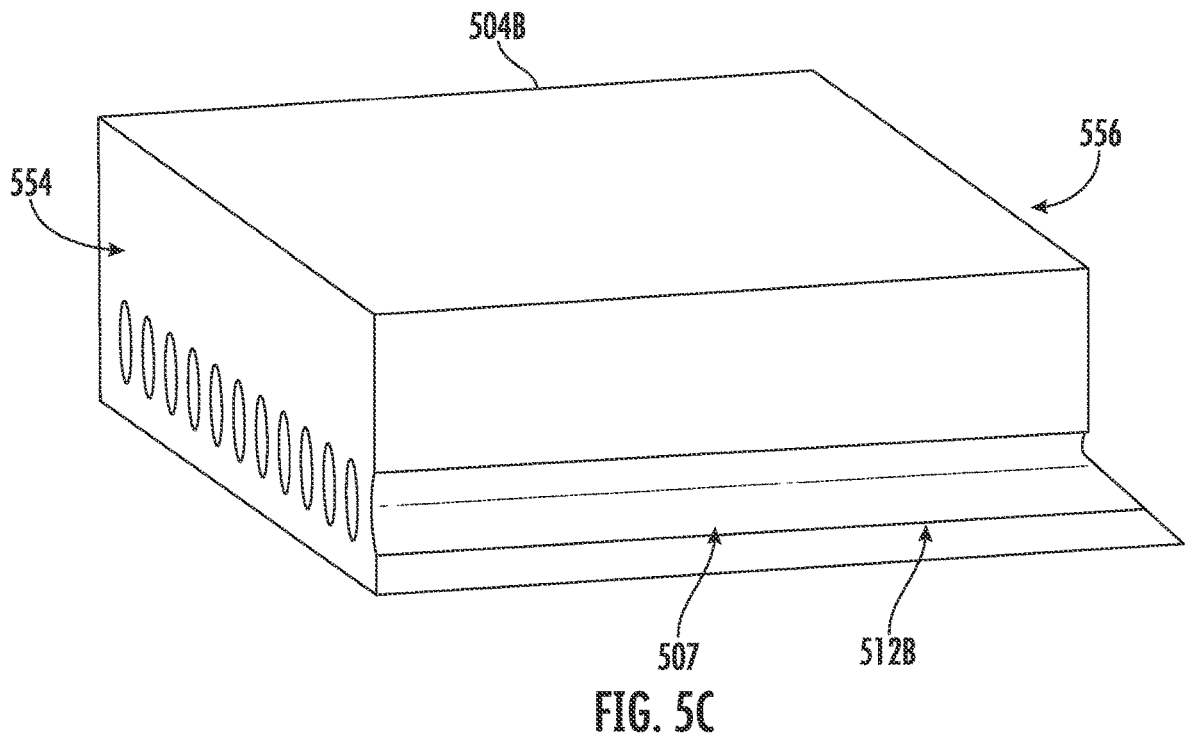
FIG. 5C is a cross-sectional view illustrating an example third piece, in accordance with some embodiments discussed herein.

In some embodiments, it may be beneficial to stack multiple pieces together to form alignment holes having a longer length. FIGS. 5A-5C illustrate features of three-piece fiber holders 500 that may be used where some pieces are stacked to form alignment holes having greater lengths. FIG. 5A is a perspective view illustrating an example three-piece fiber holder 500 for maintaining the relative orientation of fibers, and FIG. 5B is a cross-sectional view illustrating the fiber holder 500 of FIG. 5A where the cross-section of an alignment hole 512A is made visible. FIG. 5C illustrates features of a third piece 504B that may be used.

Looking first at FIG. 5A, the fiber holder 500 is illustrated. This fiber holder 500 may have several features that are similar to the fiber holders discussed above. Like the previously discussed fiber holders, the fiber holder 500 may have a first piece 502 and a second piece 504A that may be attached together. A support surface 506 may be provided on the first piece 502, and alignment holes 512A may be provided in the second piece 504A. In the fiber holder 500, a third piece 504B is also provided, and alignment holes 512B (see FIG. 5B) may also extend through the third piece 504B.

Looking now at FIG. 5B, the cross-section of alignment holes 512A, 512B may be seen. An alignment hole 512A may be aligned with an alignment hole 512B, with both holes sharing a common axis H. When aligned together, the alignment holes 512A, 512B may form a first section 501, a second section 503, and a third section 507. In the illustrated embodiment, the first section 501 and the third section 507 both have a generally uniform cross-section, but these sections may have non-uniform cross-sections in some embodiments. Additionally, the second section 503 may be tapered so that the cross-sectional size of holes increases as the second section 503 extends from the first section 501 to the third section 507. The first section 501 and the second section 503 may both be provided in the alignment holes 512A of the second piece 504A, and the third section 507 may be provided in the alignment holes 512B of the third piece 504B. The larger cross-sectional size at the third section 507 may work like a funnel to simplify fiber array alignment to the alignment holes 512A, 512B during assembly, and the smaller cross-sectional size at the first section 501 may assist in maintaining the position and/or orientation of stripped fiber sections in the alignment holes 512A.

FIG. 5C is a cross-sectional view illustrating an example third piece 504B. The third piece 504B may have a first surface 554 and a second surface 556, and alignment holes 512B may extend from the first surface 554 to the second surface 556. The alignment holes 512B may have a third section 507, and the third section 507 may generally possess the same cross-section across the entire length of the third piece 504B.

In some embodiments, the length of the second piece 504A along the Z-axis may be approximately 0.5 millimeters to 2.0 millimeters, and the length of the third piece 504B along the Z-axis may be approximately 0.5 millimeters to 2.0 millimeters. In some embodiments, laser drilling may only be effective in drilling holes up to a specific depth (e.g. 2 millimeters). Axial stacking may be done to effectively provide alignment holes of a greater length. In FIGS. 5A-5B, the second piece 504A and the third piece 504B are axially stacked about the axis H to provide alignment holes of greater length. Limitations of laser drilling may also be overcome by drilling from both sides of a piece (e.g. from the first surface 108 towards the second surface 110 and also from the second surface 110 towards the first surface 108 as described above). Where axial stacking is performed, it may be important to maintain appropriate alignment of the pieces 504A, 504B to ensure that alignment holes are appropriately positioned. It may also be important to ensure that the cross-section of the alignment hole 512B has the appropriate size and shape to ensure that stripped fiber portions may be easily inserted through the alignment hole 512B and into the alignment hole 512A. Where the alignment hole 512A has a significantly smaller size than the alignment hole 512B at the transition, a ledge may be formed that may increase the difficulty of installation.

In some embodiments, axially stacked pieces may be identical to reduce manufacturing costs. In some embodiments, alignment holes of the axially stacked pieces may have a uniform cross-section across the entire length of the alignment holes. However, in other embodiments the alignment holes may taper so that the cross-sectional size of alignment holes changes. For example, the third piece 504B of FIG. 5B could be replaced with another piece that is identical to the second piece 504A, and the cross-sectional size of the alignment holes 512A may be smaller as you move in the +Z direction (as illustrated in FIG. 5B). This would allow for larger cross-sectional sizes so that stripped fiber portions may be easily inserted into the alignment holes 512A while still maintaining a smaller cross-sectional size at other areas.

Figure 6A:
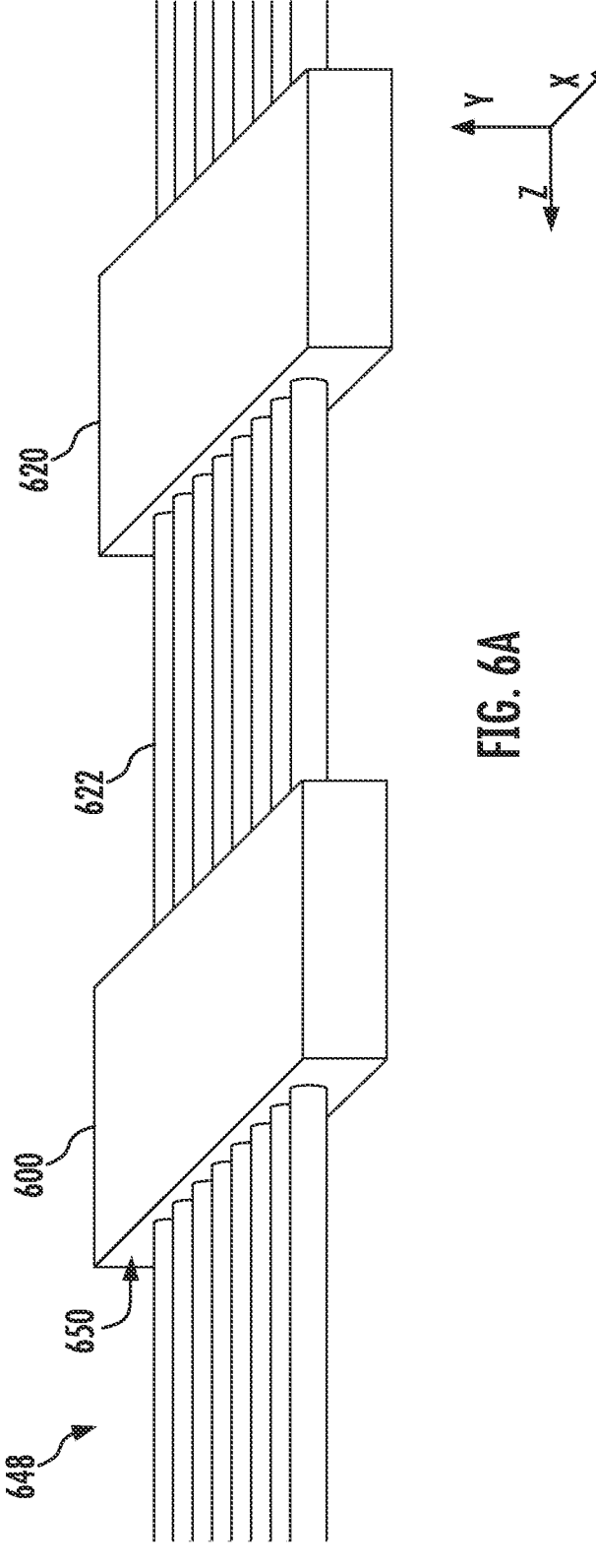
FIG. 6A is a perspective view illustrating an example first fiber holder and an example second fiber holder being used to guide stripped fiber sections of fibers, in accordance with some embodiments discussed herein.
Figures 6B, 6C:
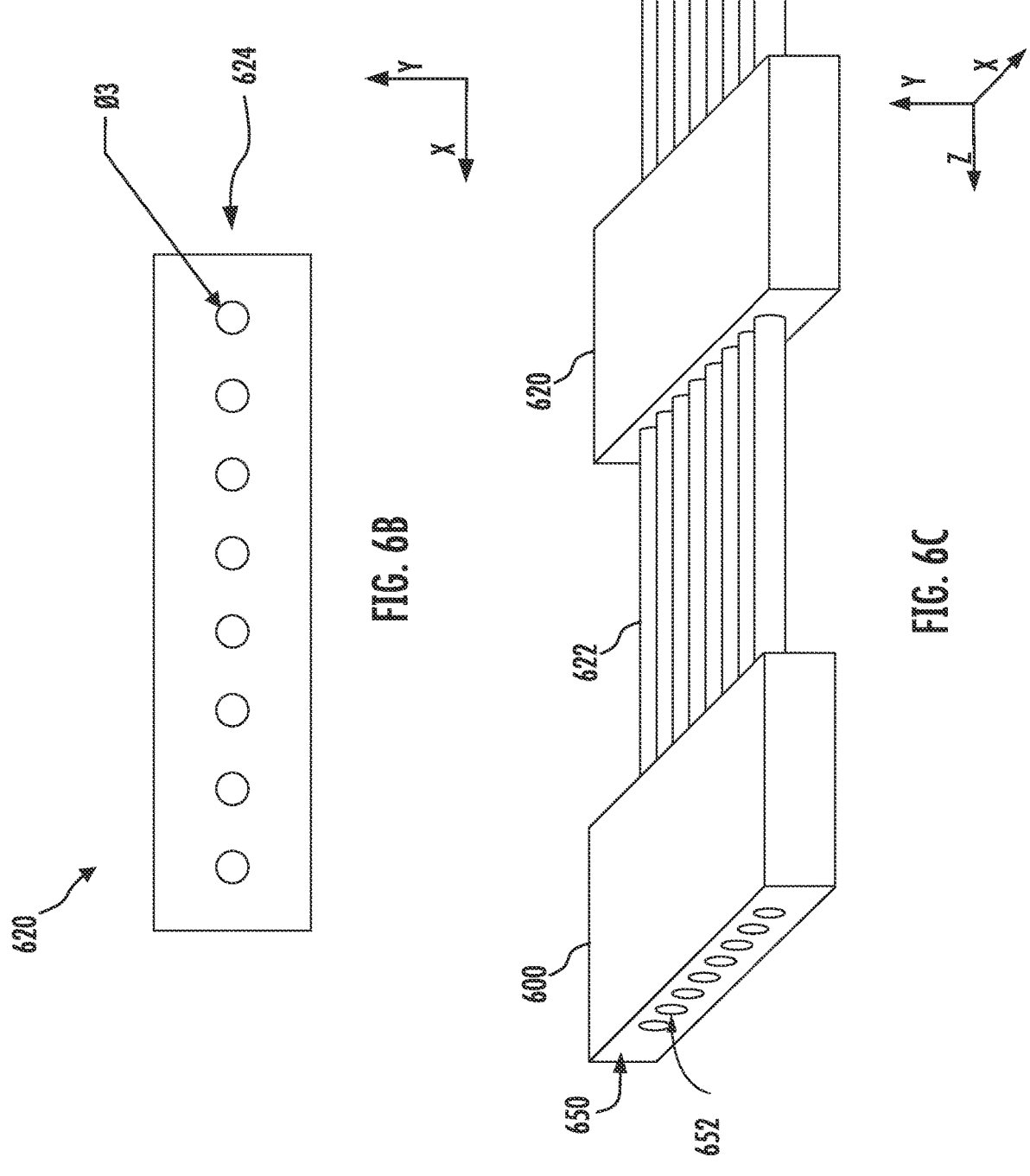
FIG. 6B is a front view illustrating an example second fiber holder, in accordance with some embodiments discussed herein.
FIG. 6C is a perspective view illustrating the first fiber holder and the second fiber holder of FIG. 6A where excess fiber is removed and end faces of the stripped fiber sections are polished, in accordance with some embodiments discussed herein.
Figure 6D:
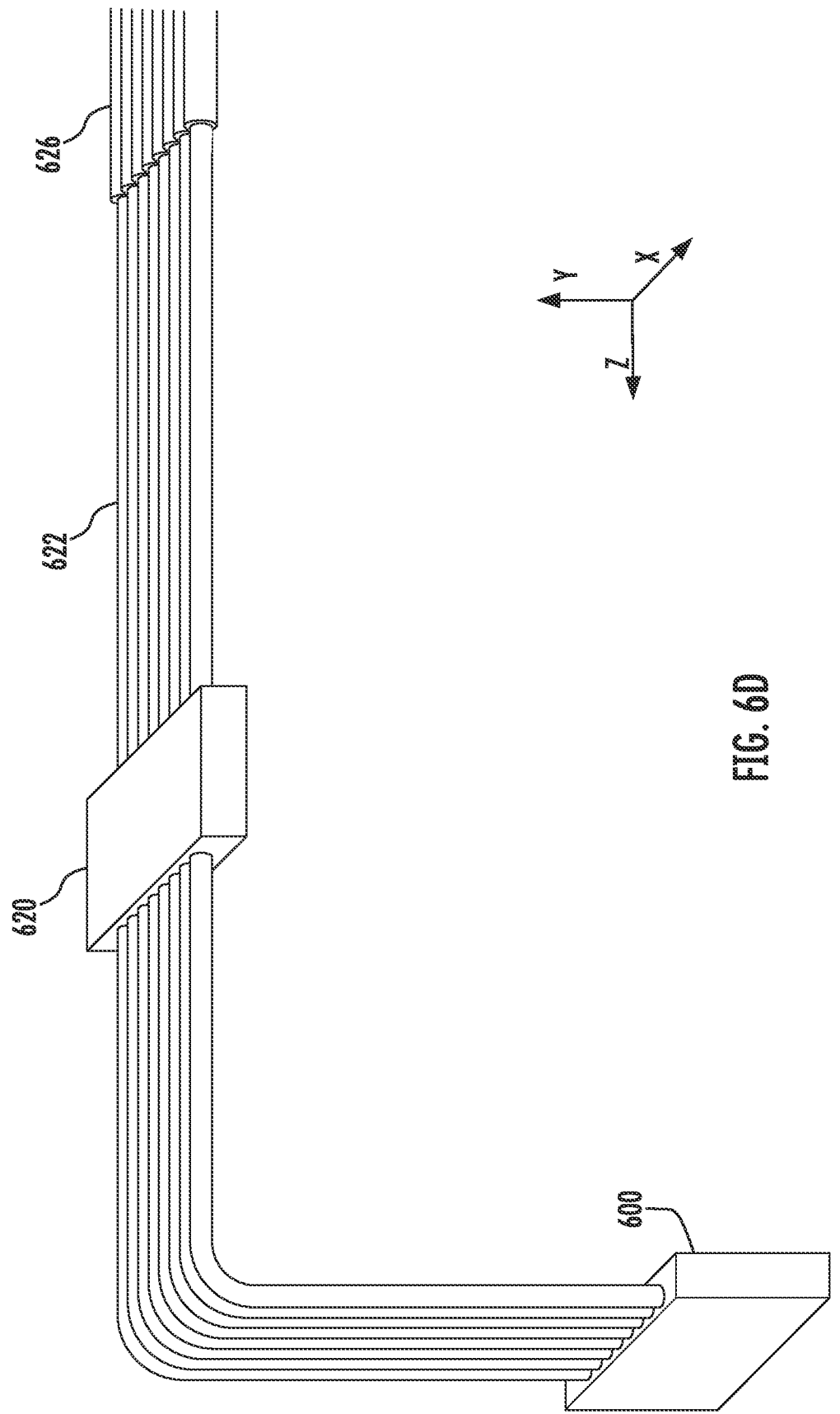
FIG. 6D is a perspective view illustrating the fiber holders and stripped fiber sections of FIG. 6A where the stripped fiber sections are bent at a location between the first fiber holder and the second fiber holder to generate a curvature in the stripped fiber sections, in accordance with some embodiments discussed herein.
Figure 6E:
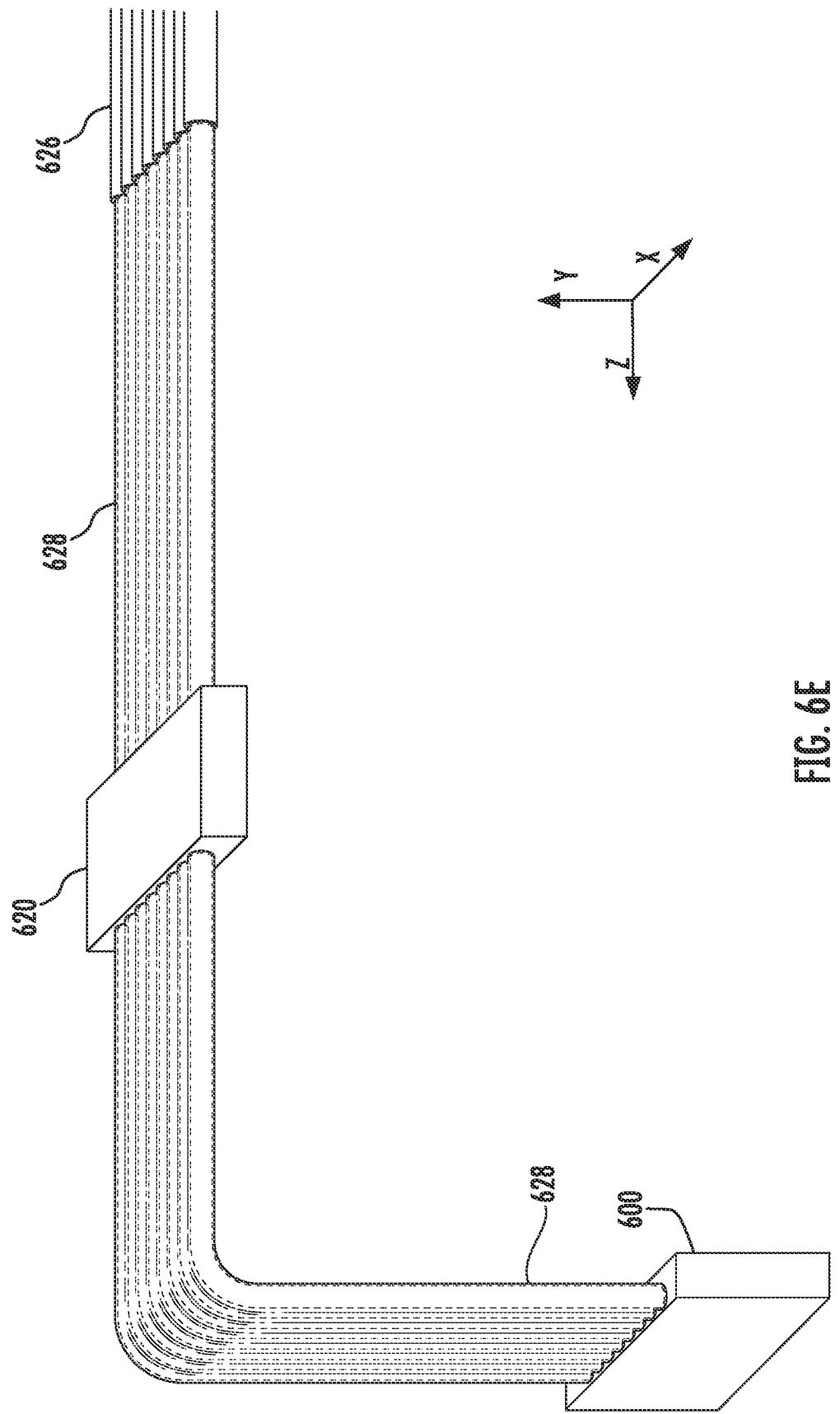
FIG. 6E is a perspective view illustrating the fiber holders and stripped fiber sections of FIG. 6D where adhesive material is applied to the stripped fiber sections, in accordance with some embodiments discussed herein.

In some embodiments, multiple fiber holders may be utilized to guide fibers or stripped fiber sections of the fibers as desired. FIG. 6A is a perspective view illustrating an example first fiber holder 600 and an example second fiber holder 620 being used to guide stripped fiber sections 622 of fibers. FIG. 6B is a front view illustrating an example second fiber holder 620. FIG. 6C is a perspective view illustrating the first fiber holder 600 and the second fiber holder 620 of FIG. 6A where excess fiber 648 is removed and end faces 652 of the stripped fiber sections are polished. FIG. 6D is a perspective view illustrating the fiber holders and stripped fiber sections of FIG. 6A where the stripped fiber sections are bent at a location between the first fiber holder and the second fiber holder to generate a curvature in the stripped fiber sections. FIG. 6E is a perspective view illustrating the fiber holders and stripped fiber sections of FIG. 6D where adhesive material is applied to the stripped fiber sections.

Looking first at FIG. 6A, a first fiber holder 600 and a second fiber holder 620 that may be used to bend stripped fiber sections are illustrated. Stripped fiber sections 622 of fibers may be inserted through guide holes 624 (see FIG. 6B) of the second fiber holder 620, and the stripped fiber sections 622 may also be inserted through alignment holes in the first fiber holder 600. Alignment holes of the first fiber holder 600 may be similar to alignment holes 112, and the alignment holes of the first fiber holder 600 may be provided with more precise positioning and dimensions than the guide holes 624 (see FIG. 6B) of the second fiber holder 620. The alignment holes of the first fiber holder 600 may have an exit diameter at the rear surface 650 that is just slightly larger than the diameter of the stripped fiber sections (e.g., the exit diameter may be 0.6 microns or two microns larger than the diameter of the stripped fiber sections). The alignment holes of the first fiber holder 600 may also have a conical shape to allow stripped fiber sections to be easily inserted into the alignment holes. Excess fiber 648 may extend past the rear surface 650 of the first fiber holder 600 in some embodiments as illustrated in FIG. 6A.

FIG. 6B illustrates a front view of the second fiber holder 620. The second fiber holder 620 may include several guide holes 624. These guide holes 624 may be spaced apart equally, and the guide holes 624 may generally possess the same diameter Ø3. The diameter Ø3 of the guide holes 624 may be larger than the diameter of the stripped fiber sections, and the diameter Ø3 of the guide holes 624 may be larger than the diameter Ø1 of the alignment holes 112 at the first surface 108 of fiber holders 100. The diameter Ø3 may be approximately 200 microns in some embodiments, but a wide variety of diameters may be used.

While the guide holes 624 are illustrated as having a circular shape, the guide holes 624 may possess other shapes. The guide holes 624 may have a varying cross-sectional shape and/or size along the +Z direction of FIG. 6A in some embodiments. For example, the cross-sectional size of guide holes 624 may have reduced size along the +Z direction of FIG. 6A.

In FIG. 6C, the components illustrated in FIG. 6A are presented again, but excess fiber 648 (see FIG. 6A) extending past the rear surface 650 of the first fiber holder 600 is removed. Thus, end faces 652 of each stripped fiber section 622 may be flush with the rear surface 650. In some embodiments, the end face 652 of each stripped fiber section 622 may be polished after any excess fiber 648 is removed. The polished end faces 652 may be surface coupled to an optoelectronic chip in some embodiments.

Turning now to FIG. 6D, the stripped fiber sections 622 of the fibers may be bent at a position between the first fiber holder 600 and the second fiber holder 620. In this way, a curvature may be generated in the stripped fiber sections 622. FIG. 6D also illustrates an outer coating 626 of the fibers. As illustrated, the outer coating 626 of fibers may be removed to provide stripped fiber sections 622. The stripped fiber sections 622 may be bent to allow surface coupling of the end faces 652 of the stripped fiber sections 622 to optoelectronic chip(s). FIG. 6D is provided solely for the purposes of illustration, and the actual dimensions of the components illustrated in FIG. 6D may differ in other embodiments. For example, curvature may be induced at other positions between the first fiber holder 600 and the second fiber holder 620.

However, in some embodiments, the amount of stripped fiber sections that are exposed may be reduced to provide increased reliability. For example, in one embodiment, optical fibers having an outer coating 626 may be inserted into the guide holes 624 of the second fiber holder 620, and the outer coating 626 may only be removed to provide stripped fiber sections 622 at the first fiber holder 600.

As illustrated in FIG. 6E, an adhesive 628 may be applied to the stripped fiber sections 622 of fibers. Adhesive 628 may be applied after the stripped fiber sections 622 have been rotated to the desired orientation. The adhesive 628 may be a protective polymer encapsulant in FIG. 6E, and this may be used to create a seal and to provide a rigid or semi-rigid bend.

Figure 6F:
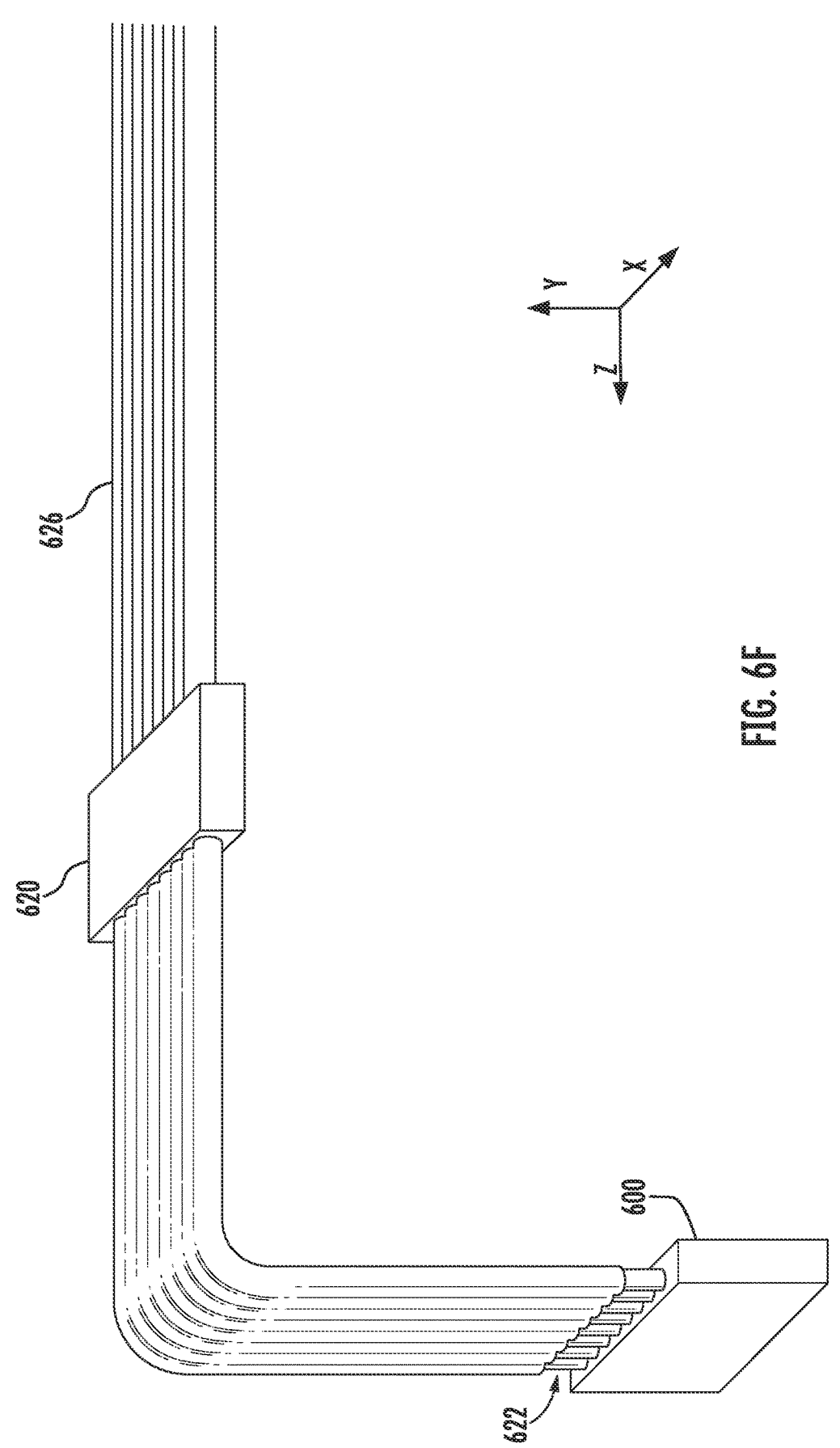
FIG. 6F is a perspective view illustrating an example first fiber holder and an example second fiber holder being used to guide fibers where the fibers are bent at a location between the first fiber holder and the second fiber holder to generate a curvature in the fibers, in accordance with some embodiments discussed herein.

FIG. 6F is a perspective view illustrating an example first fiber holder and an example second fiber holder being used to guide fibers where the fibers are bent at a location between the first fiber holder and the second fiber holder to generate a curvature in the fibers. The embodiment illustrated in FIG. 6F is similar to the one presented in FIG. 6D in several respects. For example, fiber may be provided with a stripped fiber section 622 and an outer coating 626. However, the amount of exposure of stripped fiber sections 622 is reduced in FIG. 6F. In FIG. 6F, the second fiber holder 620 may be configured to received fibers having outer coating 626, and this fiber may extend to the first fiber holder 600. At a location proximate to the first fiber holder 600, the outer coating 626 may be removed from the fibers so that stripped fiber sections 622 are exposed, and the stripped fiber sections 622 may be inserted into the first fiber holder 600.

Figure 7A:
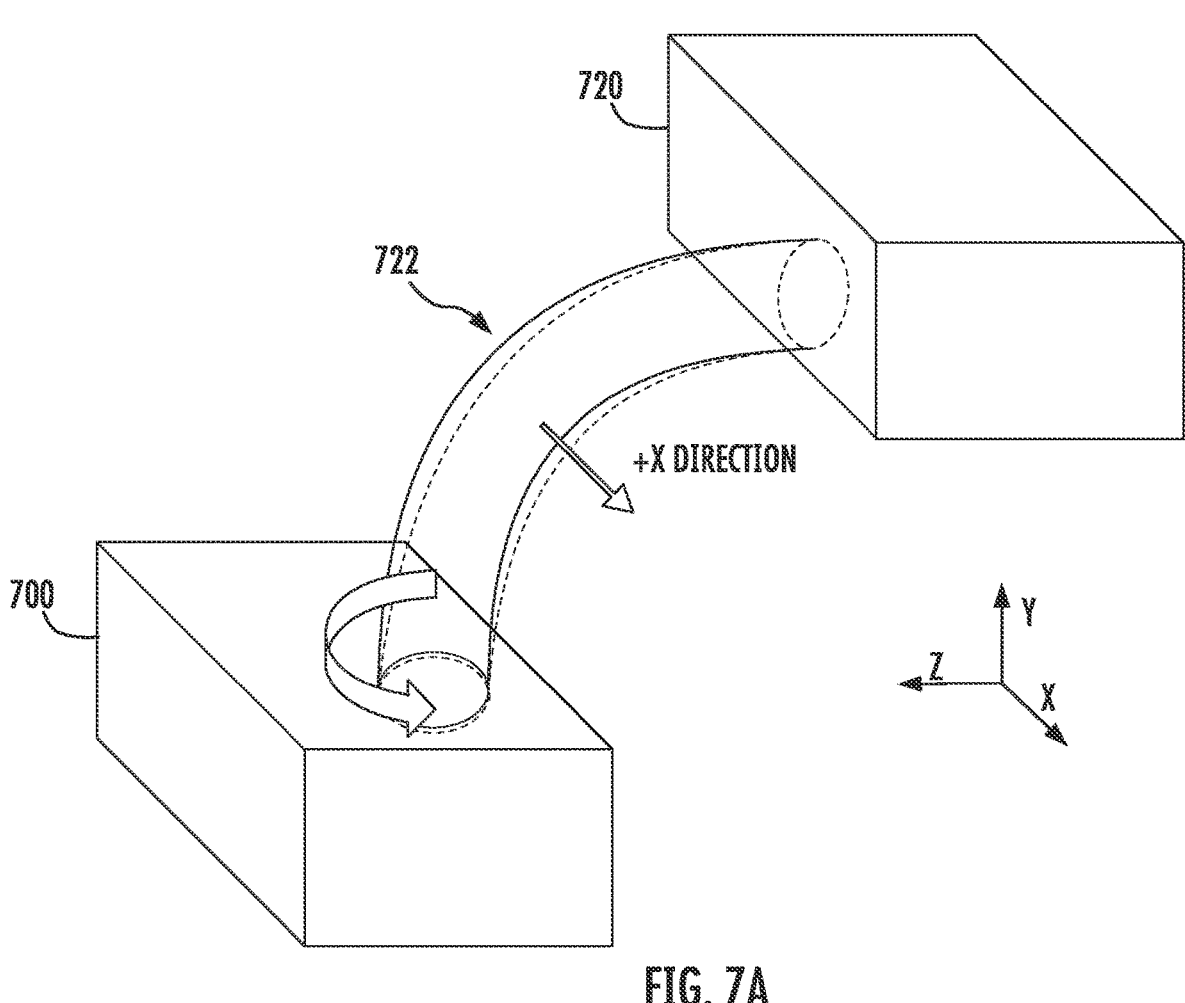
FIGS. 7A-7B are schematic views illustrating curvature of a stripped fiber section after the stripped fiber section is bent, in accordance with some embodiments discussed herein.
Figure 7B:
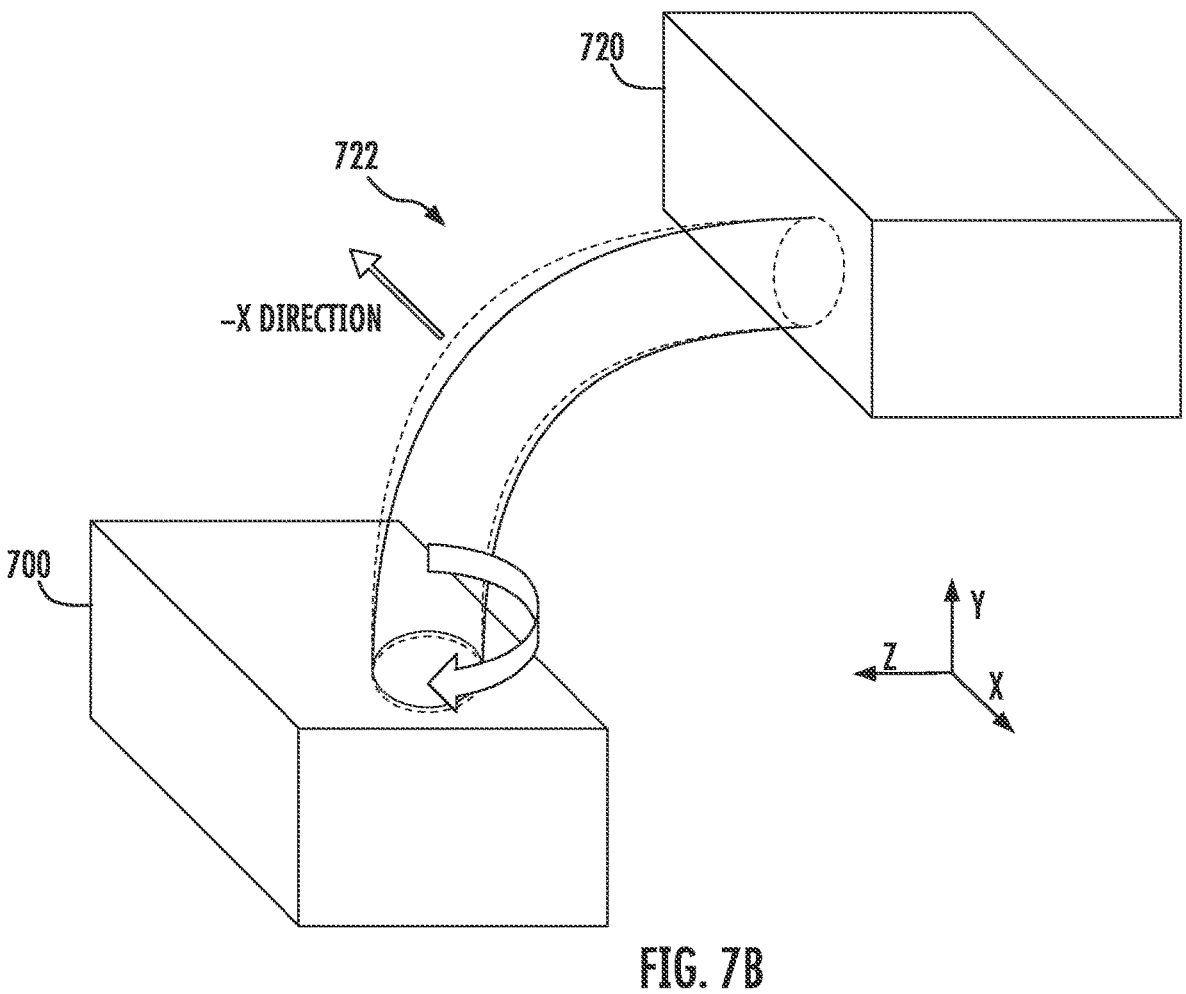

After stripped fiber sections are bent at a position between the first fiber holder and the second fiber holder, rotation of the stripped fiber sections in the first fiber holder may also cause a predictable lateral shift in the position of the stripped fiber sections. Thus, bending of the stripped fiber sections may be useful for managing buckling that occurs in stripped fiber sections. FIGS. 7A-7B are schematic views illustrating lateral shifting of a stripped fiber section 722 after the stripped fiber section 722 is rotated. As illustrated, the stripped fiber section 722 is bent at a position between the first fiber holder 700 and the second fiber holder. As illustrated in FIG. 7A, when the stripped fiber section 722 is rotated clockwise (when looking upwards in the +Y direction in FIG. 7A), this may result in a lateral shift of the stripped fiber section 722 in the +X direction. This lateral shift may occur at positions between the first fiber holder 700 and the second fiber holder 720. In FIG. 7B, when the stripped fiber section 722 is rotated counterclockwise (when looking upwards in the +Y direction in FIG. 7B), this may result in a lateral shift of the stripped fiber section 722 in the −X direction. Again, this lateral shift may occur at positions between the first fiber holder 700 and the second fiber holder 720.

Bending may be particularly useful if the stripped fiber sections 722 are part of multi-core fibers (MCFs) or polarization maintaining fibers (PMFs). The orientation of these types of fibers typically must be maintained more precisely than other fibers. For example, an approximately ninety-degree bend may be used to manage the fiber twist required for the rotation of stripped fiber sections of MCFs or PMFs, and the ninety degree bend may manage the fiber twist in a very short length. The stripped fiber sections simply shift slightly in the +X direction or the −X direction as illustrated in FIGS. 7A-7B, but the stripped fiber sections may generally stay in the plane of the bend (e.g. the Y-Z plane of FIGS. 7A-7B). Even if stripped fiber sections 722 touch or push slightly against one another, this should not affect the reliability of the assembly where the stripped fiber sections are encapsulated by an adhesive. Additionally, bending may allow a more compact assembly to be obtained.

Figure 8A:
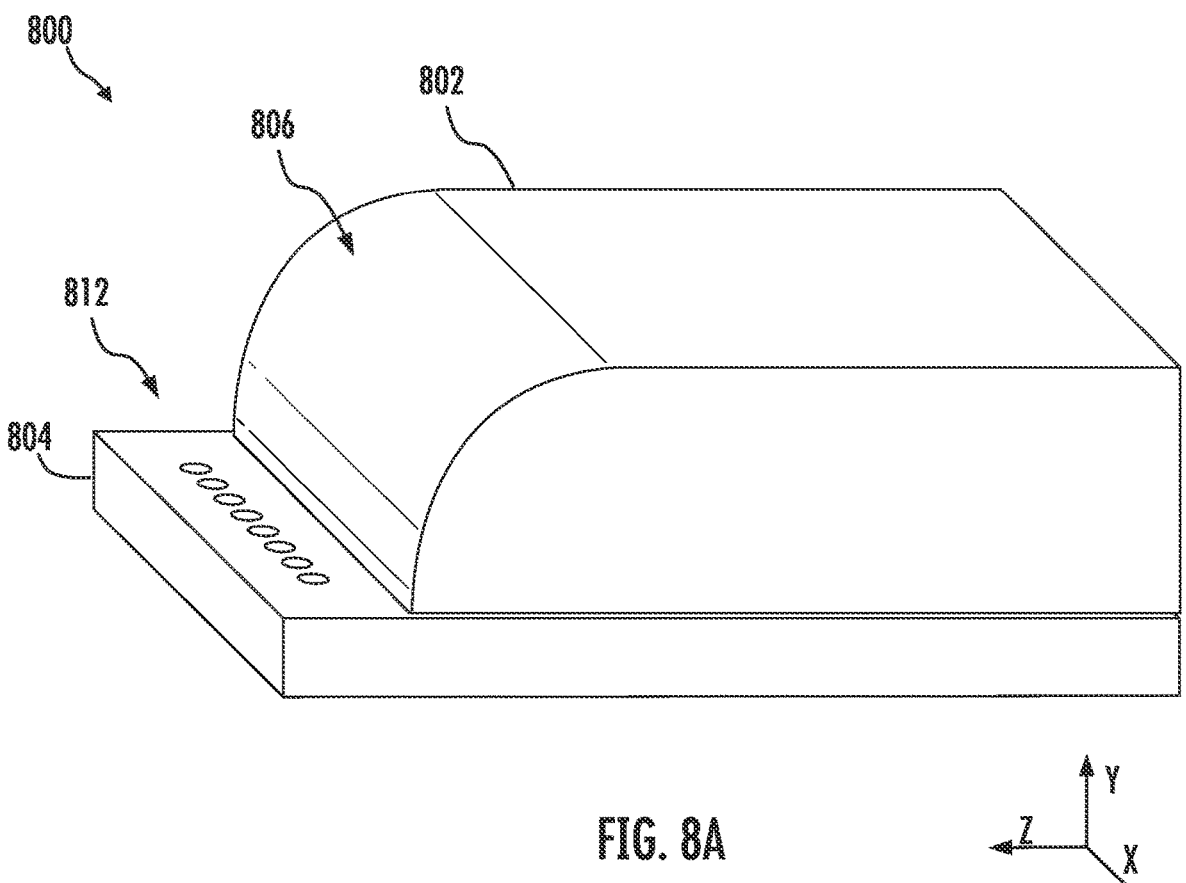
FIG. 8A is a perspective view illustrating a fiber holder having a first piece with a curved surface and a second piece, in accordance with some embodiments discussed herein.
Figure 8B:
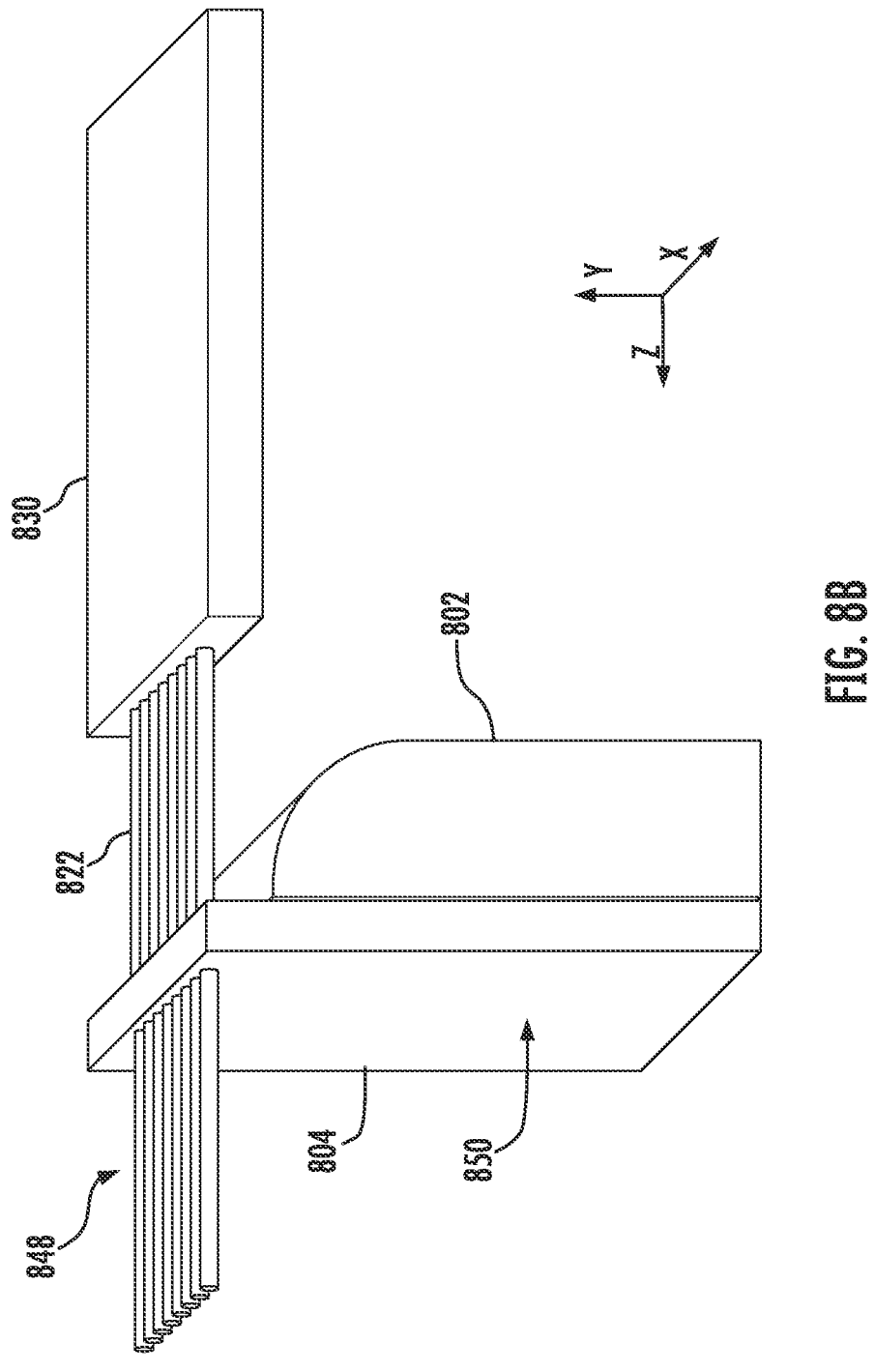
FIG. 8B is a perspective view illustrating a system having a first fiber holder, stripped fiber sections, and a second fiber holder, in accordance with some embodiments discussed herein.
Figure 8C:
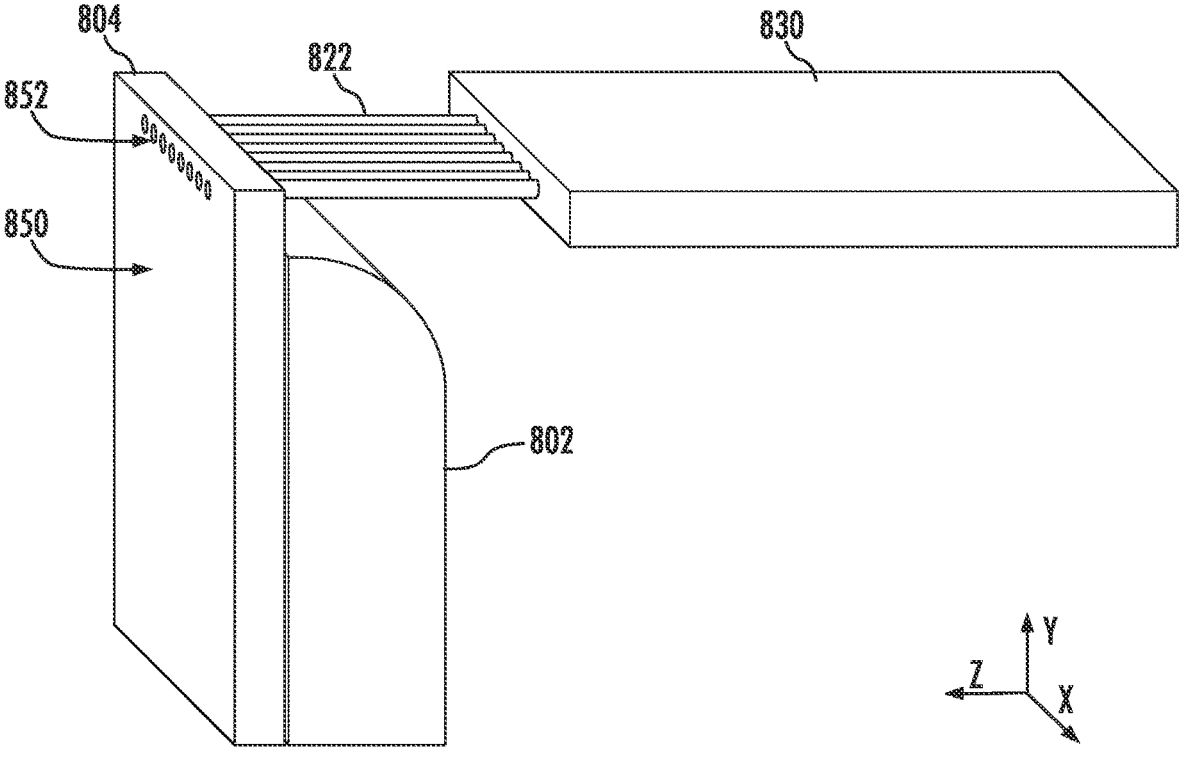
FIG. 8C is a perspective view illustrating the system of FIG. 8B where excess fibers are removed and the end faces of stripped fiber sections are polished, in accordance with some embodiments discussed herein.
Figure 8D:
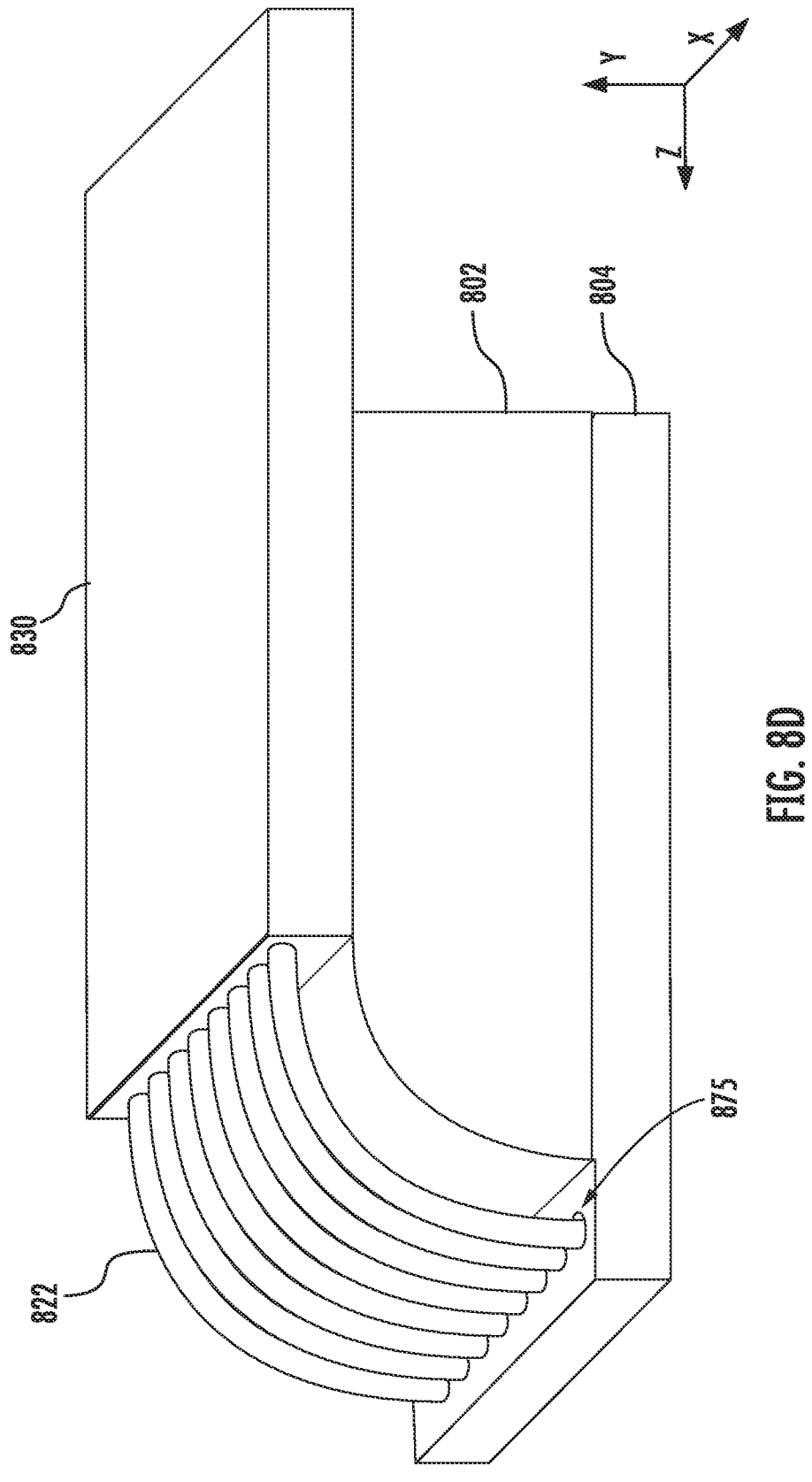
FIG. 8D is a perspective view illustrating the system of FIG. 8C where stripped fiber sections are bent between the first fiber holder and the second fiber holder, in accordance with some embodiments discussed herein.
Figure 8E:
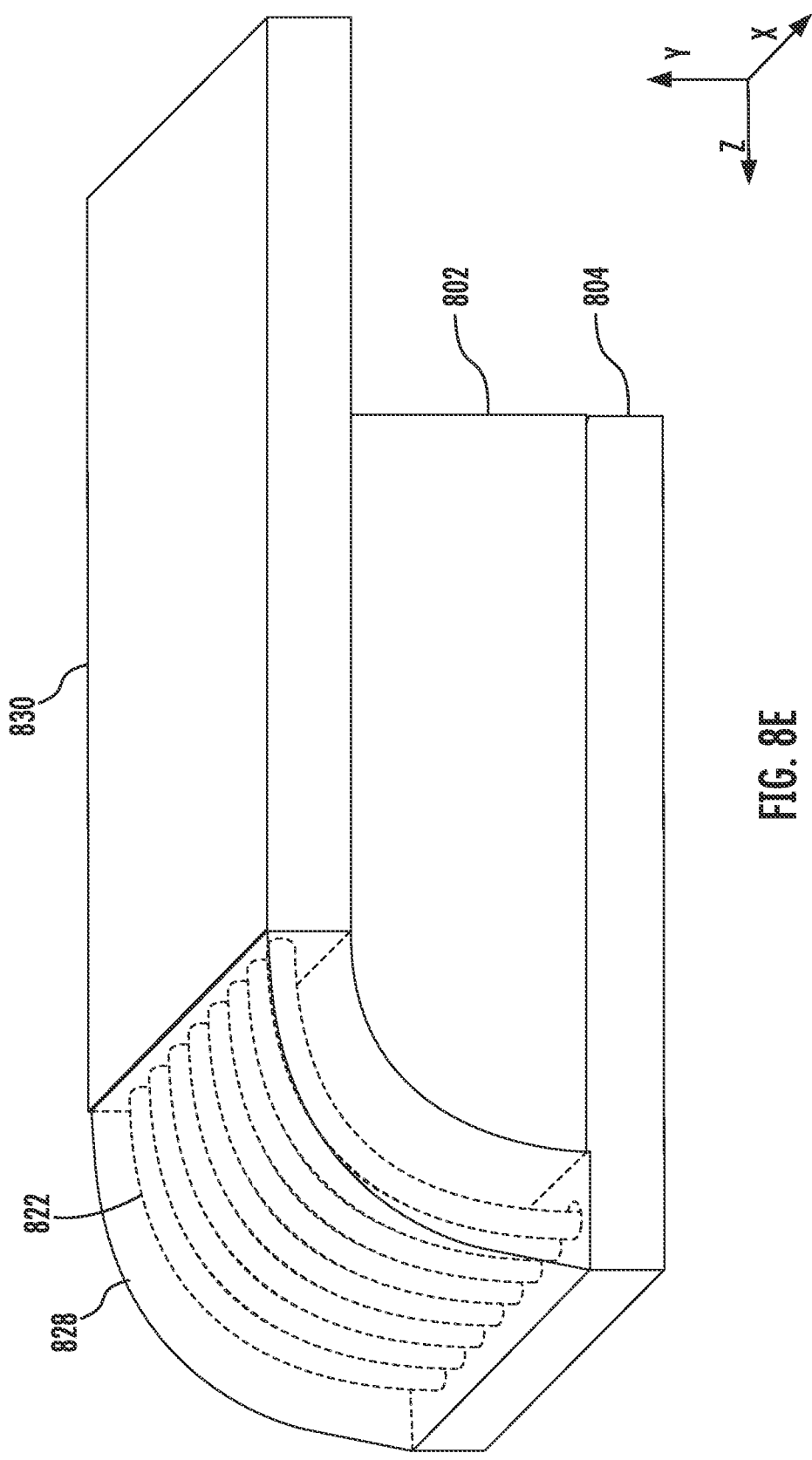
FIG. 8E is a perspective view illustrating the system of FIG. 8D where adhesive is applied at the stripped fiber sections, in accordance with some embodiments discussed herein.

Turning now to FIGS. 8A-8E, another fiber holder 800 is illustrated that may be used to bend stripped fiber sections 822. FIG. 8A is a perspective view illustrating the fiber holder 800 having a first piece with a curved surface and a second piece. FIG. 8B is a perspective view illustrating a system having a first fiber holder 800, stripped fiber sections 822, and a second fiber holder 830. FIG. 8C is a perspective view illustrating the system of FIG. 8B where excess fibers 848 are removed and the end faces 852 of the stripped fiber sections 822 are polished. Additionally, FIG. 8D is a perspective view illustrating the system of FIG. 8C where stripped fiber sections 822 are bent between the first fiber holder 800 and the second fiber holder 830. FIG. 8E is a perspective view illustrating the system of FIG. 8D where an adhesive is applied at the stripped fiber sections 822.

Looking first at FIG. 8A, the fiber holder 800 is illustrated in isolation. The fiber holder 800 may include a first piece 802 and a second piece 804. The first piece 802 may have a support surface 806 defined thereon, and the support surface 806 may be used to support and guide stripped fiber sections 822. Alignment holes 812 may be provided on the second piece 804. The first piece 802 and/or the second piece 804 may comprise glass or glass-filled plastic, but these pieces may comprise other components or different components in other embodiments.

In some embodiments, the alignment holes 812 may be formed in the second piece 804 before the first piece 802 and the second piece 804 are attached together. However, in other embodiments, the alignment holes 812 may be formed in the second piece 804 after the first piece 802 and the second piece 804 are attached together. Where an adhesive is used to fasten the first piece 802 and the second piece 804 together, it may be beneficial to drill the alignment holes 812 last to avoid adhesive and other contaminants from entering into the alignment holes 812.

Looking now at FIG. 8B, a fiber ribbon 830 is illustrated. The fiber ribbon 830 may contain a plurality of fibers therein. The outer coating (see, e.g., FIG. 6E, 626) of the fibers may be removed to expose stripped fiber sections 822. The fiber ribbon 830 may effectively serve as a fiber holder to maintain the position and orientation of the stripped fiber sections 822. Additionally, the stripped fiber sections 822 may be rotated to the appropriate orientation (if MCFs or PMFs are used) and inserted into the alignment holes 812. Some excess fiber 848 from the stripped fiber sections 822 may extend past the second surface 850 of the fiber holder 800. As illustrated in FIG. 8C, the excess fiber 848 illustrated in FIG. 8B may be removed from the stripped fiber sections 822 so that the end faces 852 of the stripped fiber sections 822 may rest flush with the second surface 850 of the fiber holder 800. Additionally, the end faces 852 of the stripped fiber sections 822 may be polished. The polished end faces 852 may be surface coupled to an optoelectronic chip in some embodiments.

In FIG. 8D, the stripped fiber sections 822 may be bent at a position between the fiber ribbon 830 and the second piece 804 of the fiber holder 800. The curved portion of the support surface 806 (see FIG. 8A) of the first piece 802 may assist in generating this bending. The fiber ribbon 830 may be rotated clockwise by ninety degrees as illustrated in FIG. 8D and positioned adjacent to the support surface 806 (see FIG. 8A) as illustrated in FIG. 8D. As illustrated in FIG. 8D, the alignment holes 812 may have a flared region 875, and this flared region 875 may be configured to permit the stripped fiber sections 822 to shift laterally (e.g. along the Z-axis in FIG. 8D). The flared region may assist in reducing stress in the stripped fiber sections 822, enabling the stripped fiber sections 822 to be installed with greater reliability. As illustrated in FIG. 8E, an adhesive 828 may be placed around the stripped fiber sections 822 whenever they are placed in the desired position and orientation, and this may protect the stripped fiber sections 822 from damage. An adhesive may also secure the fiber ribbon 830 to the support surface 806 (see FIG. 8A) of the first piece 802.

While FIGS. 8A-8E illustrate a first piece 802 having a support surface 806 with a curved portion, the first piece may be provided without any curved portion on the support surface in other embodiments. For example, the first piece may be provided in the shape of a rectangular prism in some embodiments so that a diced piece of glass may be used for the first piece. The support surface 806 having a curved portion may be beneficial to minimize the thickness of any adhesives that may be used to cover the stripped fiber sections 822, and this reduced thickness of adhesives may minimize the motion of the stripped fiber sections 822 in adhesive during any thermal cycling where the adhesive could swell and contract. Other shapes may also be utilized for the first piece 802.

Figure 9A:
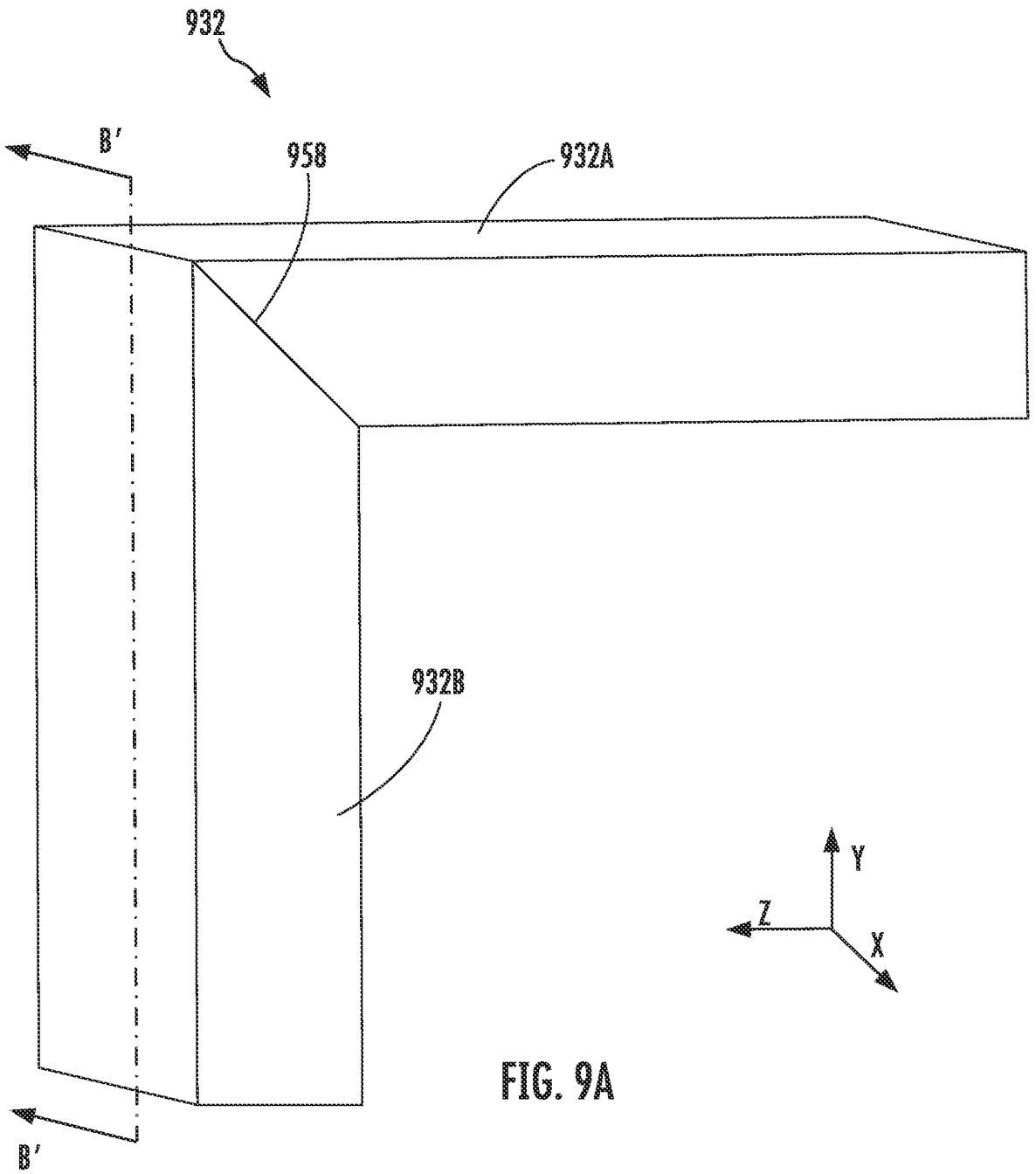
FIG. 9A is a perspective view of a fiber holder, in accordance with some embodiments discussed herein.
Figure 9B:
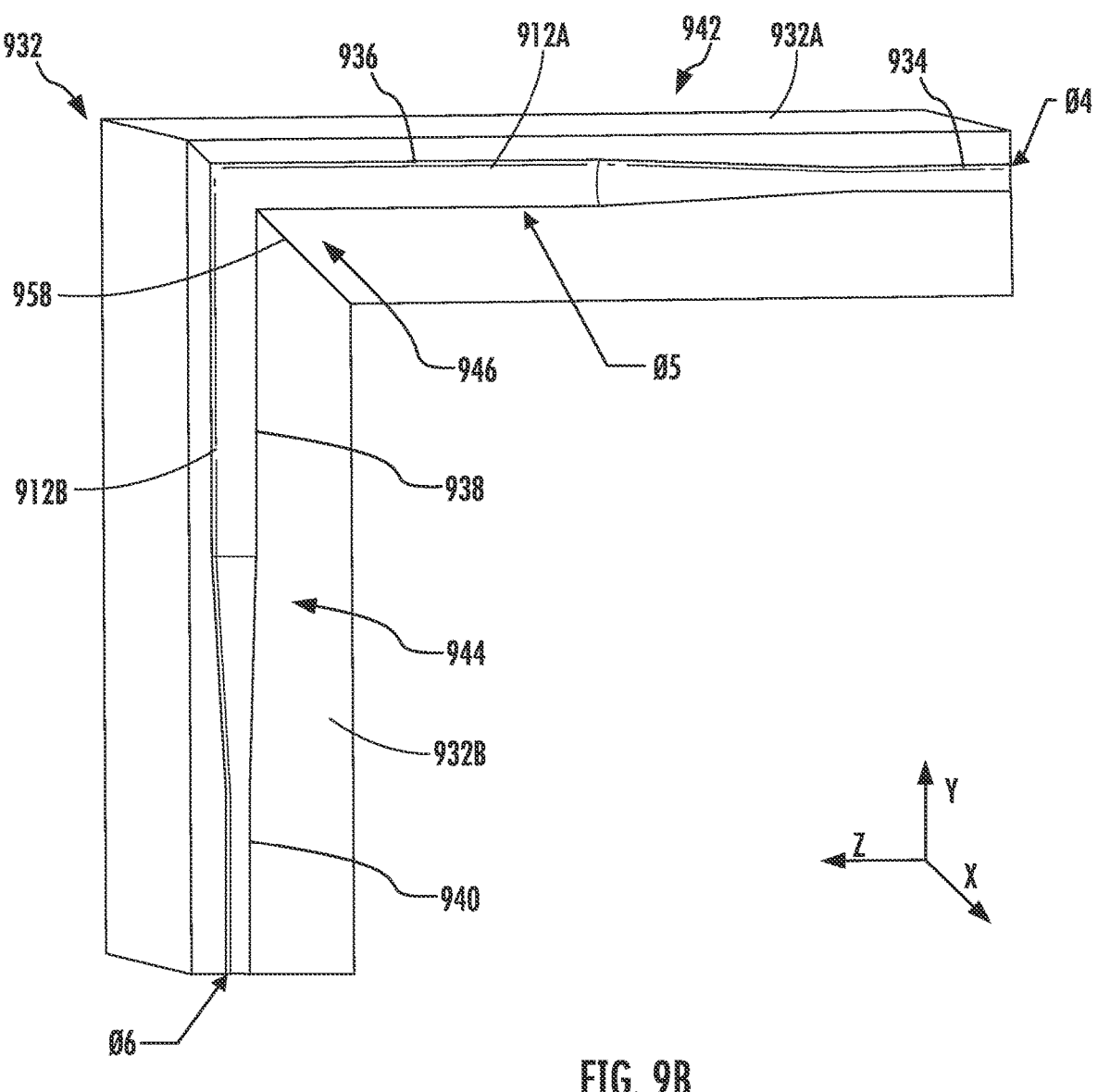
FIG. 9B is a cross-sectional view of the fiber holder of FIG. 9A where an alignment hole having a corner bend region is made visible, in accordance with some embodiments discussed herein.
Figure 9C:
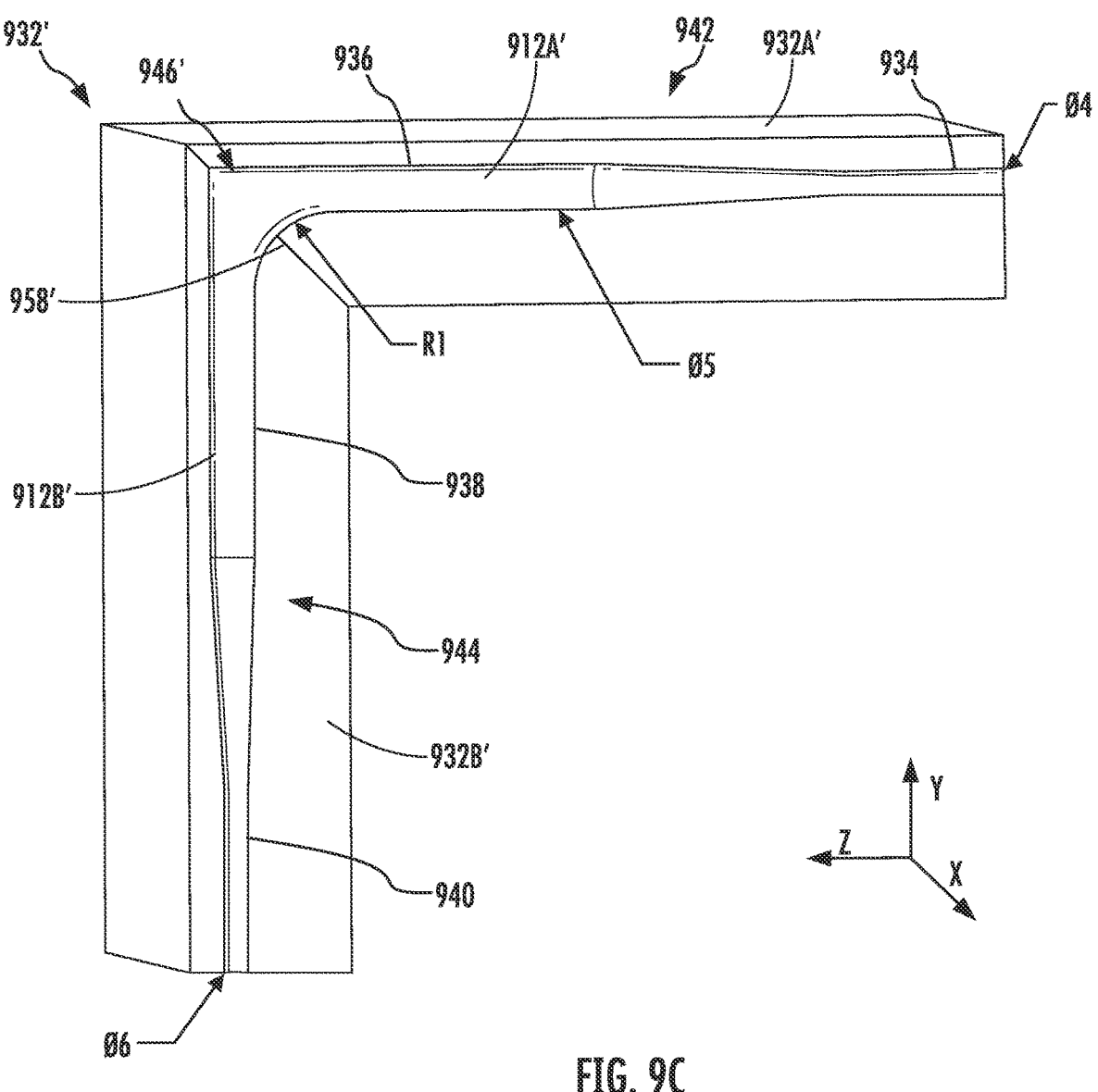
FIG. 9C is a cross-sectional view of another fiber holder where an alignment hole having a curved bend region is made visible, in accordance with some embodiments discussed herein.
Figure 9D:
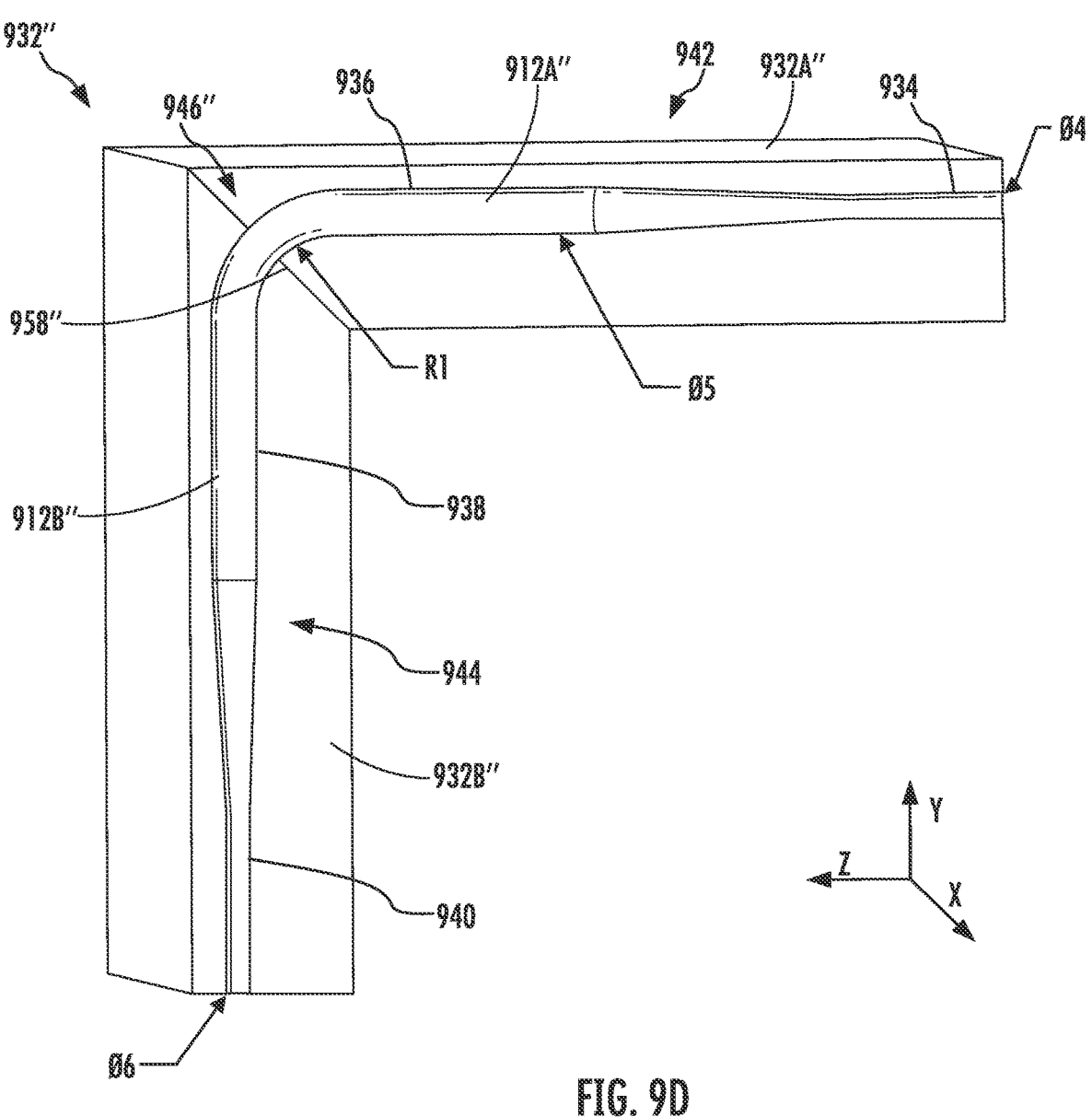
FIG. 9D is a cross-sectional view of another fiber holder where an alignment hole having a curved bend region is made visible, in accordance with some embodiments discussed herein.

Other fiber holders may be provided that may assist in bending stripped fiber sections. FIG. 9A is a perspective view of a fiber holder having a bend region, and FIG. 9B is a cross-sectional view of the fiber holder of FIG. 9A where an alignment hole having a corner bend region is made visible. FIG. 9C is a cross-sectional view of another fiber holder where an alignment hole having a curved bend region is made visible, and FIG. 9D is a cross-sectional view of yet another fiber holder where an alignment hole having a curved bend region is made visible.

Looking first at FIG. 9A, a fiber holder 932 is illustrated that may assist in bending stripped fiber sections. In the illustrated embodiment, the fiber holder 932 may be formed by a first component 932A and a second component 932B as illustrated in FIG. 9A, and the two components may be fastened together at a beveled interface 958. In other embodiments, the first fiber holder 932 may be provided as a single, unitary piece. The use of two components may be beneficial to simplify the shapes that must be manufactured.

FIG. 9B illustrates a cross-sectional view of this fiber holder 932. The fiber holder may have alignment holes 912A, 912B defined therein, and the alignment holes 912A, 912B may have a circular cross-section as illustrated in FIG. 9B. However, in other embodiments, some portion or the entire portion of the alignment holes 912A, 912B may have a circular, oval, rectangular, rectilinear, or triangular cross-sectional shape.

As illustrated, the alignment holes 912A, 912B may include various segments. For example, a first segment 934, a second segment 942, and a third segment 936, a fourth segment 938, a fifth segment 944, and a sixth segment 940 are illustrated in FIG. 9B. These segments may have different cross-sectional shapes and/or sizes. The first segment 934, the third segment 936, the fourth segment 938, and the sixth segment 940 may each have a generally uniform cross-section for their entire lengths. For example, the first segment 934 may have a circular cross-section with the diameter Ø4, the third segment 936 may have a circular cross-section with the diameter Ø5, the fourth segment 938 may have a circular cross-section with the diameter Ø5, and the sixth segment 940 may have a circular cross-section with the diameter Ø6. The diameter Ø5 of the third segment 936 and the fourth segment 938 may be greater than the diameters Ø4, Ø6 of the first segment 934 and the sixth segment 940, and this may permit an increased fiber bend radius that may lead to an improvement in the reliability of fibers.

The second segment 942 and the fifth segment 944 may have a varying cross-sectional shape and/or size across their lengths. In the illustrated embodiment, the second segment 942 may transition from the smaller diameter Ø4 of the first segment 934 to the larger diameter Ø5 of the third segment. Similarly, in the illustrated embodiment, the fifth segment 944 may transition from the larger diameter Ø5 of the fourth segment 938 to the smaller diameter Ø6 of the sixth segment 940.

The larger diameter Ø5 used at the third segment 936 and the fourth segment 938 may permit bending of stripped fiber sections in the alignment holes 912A, 912B of the fiber holder 932. This bending may occur at the bend region 946. The bend region 946 possesses a right angle, but the bend region may have a curvature in other embodiments. For example, the fiber holder 932' of FIG. 9C illustrates a curved bend region 946' having an internal radius R1. In some embodiments, the internal radius may be above the minimum bend radius for fiber reliability and/or above the minimum bend radius for loss. The internal radius R1 may be greater than 5 millimeters in some embodiments, but the internal radius R1 may be greater than 10 millimeters in other embodiments. FIG. 9C also shows a slightly modified beveled interface 958', alignment hole 912A', alignment hole 912B', first component 932A', and second component 932B'.

As a further example, the fiber holder 932" of FIG. 9D illustrates another curved bend region 946" having an internal radius R1 (this may be the same as the internal radius R1 of the curved bend region 946' in FIG. 9C). The alignment holes 912A", 912B" may generally maintain the same diameter Ø5 throughout the length of the curved bend region 946" so that a continuous alignment hole is provided through the curved bend region 946". FIG. 9D also shows a slightly modified beveled interface 958", alignment hole 912A", alignment hole 912B", first component 932A", and second component 932B".

In addition to the fiber holders and other systems described above, various methods are contemplated for the assembly of fibers in fiber holders. FIG. 10 is a flow chart illustrating an example method 1000 for installing fibers. At operation 1002, a first fiber holder having a first alignment hole and an adjacent alignment hole may be provided. The first fiber holder may have a first surface and a second surface. The first fiber holder may also have at least two alignment holes including the first alignment hole and the adjacent alignment hole. The at least two alignment holes may extend from the first surface to the second surface. The at least two alignment holes may each be configured to receive stripped fiber sections of a fiber. The first fiber holder may also include a wall separating the first alignment hole and the adjacent alignment hole. The wall may be configured to permit rotation of a stripped fiber section of the first fiber in the first alignment hole without causing rotation of a stripped fiber section of an adjacent fiber in the adjacent alignment hole. Similarly, the wall may be configured to permit rotation of the stripped fiber section of the adjacent fiber in the adjacent alignment hole without causing rotation of the stripped fiber section of the first fiber in the first alignment hole.

At operation 1004, a first fiber and an adjacent fiber may be provided. In some embodiments, additional fibers may be provided at operation 1004. The first fiber may have a stripped fiber section, and the adjacent fiber may also have a stripped fiber section. A second fiber holder having at least two guide holes may be provided at operation 1006, although in some embodiments, a second fiber holder may not be used—such as if no bending of the fibers is needed.

At operation 1008, the stripped fiber section of the first fiber and the stripped fiber section of the adjacent fiber may be inserted through the more guide holes of the second fiber holder. Additionally, at operation 1010, the stripped fiber section of the first fiber may be inserted into the first alignment hole. At operation 1012, the stripped fiber section of the first fiber may be rotated to the desired first orientation.

At operation 1014, the stripped fiber section of the adjacent fiber may be inserted in the adjacent alignment hole. At operation 1016, the stripped fiber section of the adjacent fiber may be rotated to the desired second orientation.

At operation 1018, adhesive may be applied to the fibers. In some embodiments, the adhesive may be applied to the fibers after the stripped fiber section of the first fiber has been rotated to the desired first orientation and after the stripped fiber section of the adjacent fiber has been rotated to the desired second orientation. Additionally, adhesive may be applied to the stripped fiber sections of the fibers in some embodiments.

In some embodiments, adhesive may be applied after each stripped fiber section has been positioned in the desired orientation, and the next fiber may then be inserted into an alignment hole and rotated to the desired orientation. For example, adhesive may be applied to the stripped fiber section of the first fiber after operation 1012 in some embodiments, and adhesive may also be applied to the stripped fiber section of the adjacent fiber after operation 1016. In other embodiments, all fibers may be inserted into alignment holes and rotated to the desired orientation, and then adhesive may be applied at one time to secure the fibers.

At operation 1019, adhesive may be cured. At operation 1020, excess fiber may be removed from the fibers. This excess fiber may extend past the second surface of the first fiber holder, and all of the excess fiber extending past the second surface may be removed. Additionally, or alternatively, at operation 1022, the end faces of the stripped fiber sections may be polished. In some embodiments, the polished end faces may be surface coupled to an optoelectronic chip.

At operation 1024, the stripped fiber sections of the first fiber and the adjacent fiber may be bent at a position between the first fiber holder and the second fiber holder. In this way, a curvature may be generated in the stripped fiber sections of the first fiber and the adjacent fiber. In some embodiments, operation 1024 may be performed after the stripped fiber sections of the first fiber and the second fiber have been inserted through the guide holes of the second fiber holder and inserted in the alignment holes of the first fiber holder.

FIG. 10 is an example flow chart illustrating operations that may be performed to install fibers. Operations described herein may be performed in any order unless otherwise noted. For example, the first fiber and the adjacent fiber may be introduced at the same time in some embodiments. Further, additional operations may be performed, and some operations may be omitted.

Figure 11:
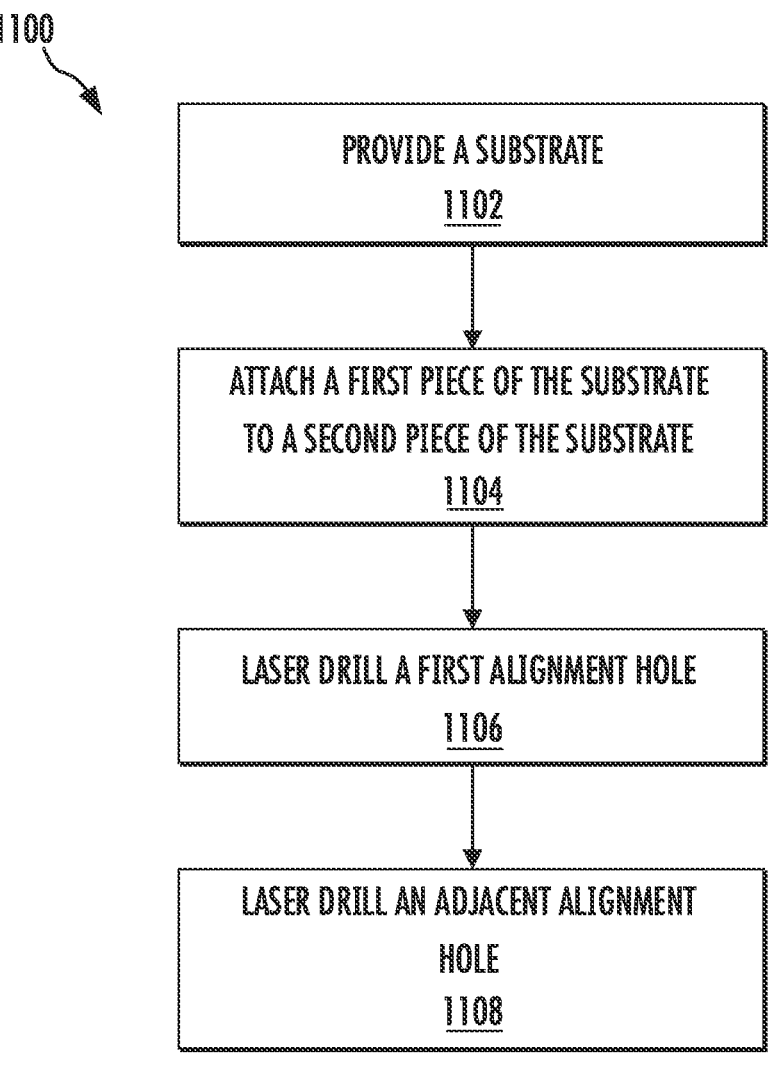
FIG. 11 is a flow chart illustrating an example method for forming a fiber holder, in accordance with some embodiments discussed herein.

Methods are also contemplated for the formation of fiber holders. FIG. 11 is a flow chart illustrating an example method 1100 for forming a fiber holder. At operation 1102, a substrate may be provided. The substrate may have a first side and a second side. Additionally, the substrate may include two or more pieces including a first piece and a second piece in some embodiments. Where this is the case, operation 1104 may be performed, and the first piece of the substrate may be attached to the second piece of the substrate.

At operation 1106, a first alignment hole may be formed in the substrate (e.g., via laser drilling). The first alignment hole may be laser drilled from the first side of the substrate towards the second side of the substrate. In some embodiments, laser drilling may be performed in two directions (e.g. from the first side of the substrate towards the second side of the substrate and also from the second side of the substrate towards the first side of the substrate) to provide an alignment hole having a greater length. A first portion of the first alignment hole may be manufactured by laser drilling from the first surface towards the second surface, and a second portion of the first alignment hole may be manufactured by laser drilling from the second surface towards the first surface.

At operation 1108, an adjacent alignment hole may be formed in the substrate (e.g., via laser drilling). In some embodiments, the adjacent alignment hole may be laser drilled in a manner similar to the first alignment hole. The adjacent alignment hole may be laser drilled adjacent to the first alignment hole so that a wall is maintained between the first alignment hole and the adjacent alignment hole. This wall may have a minimum width of at least 20 microns, but other widths may be utilized.

FIG. 11 is one example flow chart illustrating operations that may be performed to form a fiber holder. Operations described herein may be performed in any order unless otherwise noted. For example, operations 1106 and 1108 may be performed before operation 1104 in some embodiments. Further, additional operations may be performed, and some operations may be omitted.

It will therefore be readily understood by those persons skilled in the art that the embodiments of present disclosure are susceptible of broad utility and application. Many embodiments and adaptations other than those herein described, as well as many variations, modifications and equivalent arrangements, will be apparent from or reasonably suggested by the foregoing description, without departing from the substance or scope of the embodiments described herein. Accordingly, it is to be understood that this disclosure is only illustrative and exemplary and made merely for purposes of providing a full and enabling disclosure. The foregoing disclosure is not intended or to be construed to limit or otherwise to exclude any such other embodiments, adaptations, variations, modifications and equivalent arrangements.

What is claimed is:

1. A system for maintaining relative orientation of at least two optical fibers in an array, the system comprising:

the at least two optical fibers extending parallel in a same direction along a Z-axis, wherein the at least two optical fibers are multi-core fibers, wherein the at least two optical fibers includes a first optical fiber and an adjacent optical fiber, wherein at least a portion of each of the at least two optical fibers is stripped to remove an outer coating from each of the at least two optical fibers so that at least two stripped optical fiber sections are provided; and a fiber holder comprising:

a first surface and a second surface;

at least two alignment holes that are configured to receive the at least two stripped optical fiber sections, wherein the at least two alignment holes extend from the first surface to the second surface, wherein the at least two alignment holes includes a first alignment hole configured to receive a stripped optical fiber section of the first optical fiber and an adjacent alignment hole configured to receive a stripped optical fiber section of the adjacent optical fiber; and a wall, wherein the wall separates the first alignment hole and the adjacent alignment hole, wherein the wall is configured to permit rotation of the stripped optical fiber section of the adjacent optical fiber in the adjacent alignment hole without causing rotation of the stripped optical fiber section of the first optical fiber in the first alignment hole, wherein the wall defines a width of 20 to 125 microns, wherein the first alignment hole and the second alignment hole are each formed by laser drilling from the first surface towards the second surface and also by laser drilling from the second surface towards the first surface.

2. The system of claim 1, wherein the first alignment hole has a first cross-sectional size at the first surface, wherein the first alignment hole has a second cross-sectional size at the second surface, and wherein the first cross-sectional size is larger than the second cross-sectional size.

3. The system of claim 1, wherein the first alignment hole is configured to hold only one stripped optical fiber section of an optical fiber therein.

4. The system of claim 1, wherein the stripped optical fiber section of the first optical fiber has a diameter, wherein the first alignment hole has a hole diameter defined at the second surface, wherein the hole diameter exceeds the diameter of the stripped optical fiber section of the first optical fiber by two microns or less.

5. The system of claim 4, wherein the hole diameter exceeds the diameter of the stripped optical fiber section of the first optical fiber by 0.5 microns or less.

6. The system of claim 1, wherein the first alignment hole has a circular, oval, rectangular, rectilinear, hexagonal, or triangular cross-sectional shape.

7. The system of claim 1, wherein the fiber holder comprises two or more pieces including a first piece and a second piece, wherein a support surface is provided on the first piece, wherein the at least two alignment holes are provided on the second piece, and wherein the first piece and the second piece are attached together.

8. The system of claim 7, further comprising a third piece, wherein the third piece includes a first surface and a second surface, wherein the third piece includes at least two additional alignment holes extending from the first surface of the third piece to the second surface of the third piece, wherein the at least two additional alignment holes includes a first additional alignment hole, wherein the second piece and the third piece are configured to be attached adjacent to each other so that the first alignment hole and the first additional alignment hole are axially aligned.

9. The system of claim 7, wherein the support surface is curved.

10. The system of claim 1, wherein the fiber holder is integrally formed as a single component.

11. A fiber holder for maintaining relative orientation of at least two optical fibers, wherein the at least two optical fibers are multi-core fibers, the fiber holder comprising:

a first surface and a second surface;

at least two alignment holes that are configured to receive at least two stripped optical fiber sections of the at least two fibers, wherein the at least two alignment holes extend from the first surface to the second surface, wherein the at least two alignment holes includes a first alignment hole configured to receive a stripped optical fiber section of a first optical fiber of the at least two optical fibers and an adjacent alignment hole configured to receive a stripped optical fiber section of an adjacent optical fiber of the at least two optical fibers, wherein the adjacent optical fiber is adjacent to the first optical fiber; and a wall, wherein the wall separates the first alignment hole and the adjacent alignment hole, wherein the wall is configured to permit rotation of the stripped optical fiber section of the adjacent optical fiber in the adjacent alignment hole without causing rotation of the stripped optical fiber section of the first optical fiber in the first alignment hole, wherein the wall defines a width of 20 to 125 microns, wherein the first alignment hole and the second alignment hole are each formed by laser drilling from the first surface towards the second surface and also by laser drilling from the second surface towards the first surface.

12. A fiber holder produced by a process of:

providing a substrate having a first side and a second side;

laser drilling a first alignment hole from the first side of the substrate towards the second side of the substrate; and laser drilling an adjacent second alignment hole adjacent to the first alignment hole, wherein a wall is maintained between the first alignment hole and the adjacent second alignment hole, wherein the wall defines a width of 20 to 125 microns, wherein the first alignment hole and the adjacent second alignment hole are configured to receive at least two stripped optical fiber sections of at least two fibers, wherein the at least two optical fibers are multi-core fibers, wherein the first alignment hole and the adjacent second alignment hole extend from the first surface to the second surface, wherein the wall separates the first alignment hole and the adjacent second alignment hole, wherein the wall is configured to permit rotation of the stripped optical fiber section of one of the at least two fibers in the first alignment hole without causing rotation of the stripped optical fiber section of an adjacently positioned another of the at least two fibers in the adjacent second alignment hole.

13. The fiber holder of claim 12, wherein the substrate comprises two or more pieces including a first piece and a second piece, wherein the fiber holder is further produced by the process of:

attaching the first piece to the second piece; and laser drilling the first alignment hole and the adjacent alignment hole in the second piece.

* * * * *